US012613397B2

(12) United States Patent
Shimada et al.

(10) Patent No.: US 12,613,397 B2
(45) Date of Patent: Apr. 28, 2026

(54) IMAGING LENS AND IMAGING APPARATUS

(71) Applicant: FUJIFILM Corporation, Tokyo (JP)

(72) Inventors: Yasutaka Shimada, Saitama (JP); Shunsuke Miyagishima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 333 days.

(21) Appl. No.: 18/304,391

(22) Filed: Apr. 21, 2023

(65) Prior Publication Data

US 2023/0341664 A1 Oct. 26, 2023

(30) Foreign Application Priority Data

Apr. 26, 2022 (JP) ................................. 2022-072610

(51) Int. Cl.
| | |
|---|---|
| *G02B 9/00* | (2006.01) |
| *G02B 9/12* | (2006.01) |
| *G02B 13/18* | (2006.01) |
| *G02B 15/14* | (2006.01) |
| *G02B 15/22* | (2006.01) |
| *G03B 13/34* | (2021.01) |

(52) U.S. Cl.
CPC .............. *G02B 13/18* (2013.01); *G02B 9/12* (2013.01); *G02B 15/143503* (2019.08); *G02B 15/22* (2013.01); *G03B 13/34* (2013.01)

(58) Field of Classification Search
CPC ...... G02B 15/00; G02B 15/14; G02B 15/143; G02B 15/1431; G02B 15/143103; G02B 15/1435; G02B 15/143503; G02B 15/22; G02B 9/00; G02B 9/12; G02B 9/34; G02B 9/60; G02B 9/62; G02B 9/64; G02B 13/00; G02B 13/001; G02B 13/0015; G02B 13/002; G02B 13/0045; G02B 13/008; G02B 13/02; G02B 13/04; G02B 13/14; G02B 13/143; G02B 13/146; G02B 13/18; G02B 13/34
USPC .................................. 359/676–690, 745–792
See application file for complete search history.

(56) References Cited

U.S. PATENT DOCUMENTS

| | | | | |
|---|---|---|---|---|
| 5,530,593 A | * | 6/1996 | Shibayama | .......... G02B 27/646 |
| | | | | 359/554 |
| 5,724,192 A | * | 3/1998 | Lee | ................ G02B 15/143103 |
| | | | | 359/689 |

(Continued)

FOREIGN PATENT DOCUMENTS

| | | |
|---|---|---|
| JP | H08-313803 A | 11/1996 |
| JP | 2013-007853 A | 1/2013 |

(Continued)

OTHER PUBLICATIONS

"Notice of Reasons for Refusal" Office Action issued in JP 2022-072610; mailed by the Japanese Patent Office on Nov. 25, 2025.

*Primary Examiner* — Thong Q Nguyen
(74) *Attorney, Agent, or Firm* — Studebaker Brackett PLLC

(57) ABSTRACT

The imaging lens includes, in order from an object side, a first lens group that has a refractive power, a second lens group that has a positive refractive power, and a third lens group that has a negative refractive power. During focusing, the second lens group moves. The second lens group includes a stop and at least three negative lenses. The imaging lens satisfies predetermined conditional expressions.

18 Claims, 25 Drawing Sheets

EXAMPLE 2

(56)        References Cited

U.S. PATENT DOCUMENTS

| | | | |
|---|---|---|---|
| 5,805,359 A | 9/1998 | Yamanashi | |
| 5,867,325 A * | 2/1999 | Ohtake | G02B 15/177 |
| | | | 359/689 |
| 8,395,849 B2 * | 3/2013 | Muratani | G02B 15/143503 |
| | | | 359/689 |
| 8,587,880 B2 * | 11/2013 | Suzuki | G02B 13/0045 |
| | | | 359/716 |
| 11,092,778 B2 | 8/2021 | Maetaki | |
| 11,092,780 B2 | 8/2021 | Mori | |
| 11,196,058 B2 | 12/2021 | Ebato et al. | |
| 11,988,846 B2 | 5/2024 | Ishibashi | |
| 2013/0141629 A1 | 6/2013 | Yoshinaga et al. | |
| 2018/0252898 A1 | 9/2018 | Noda | |
| 2020/0174231 A1 | 6/2020 | Noda | |
| 2021/0231930 A1 | 7/2021 | Miyagishima | |
| 2021/0255442 A1 | 8/2021 | Kondo | |
| 2022/0390718 A1 | 12/2022 | Noda | |

FOREIGN PATENT DOCUMENTS

| | | | |
|---|---|---|---|
| JP | 2013-029658 A | 2/2013 |
| JP | 2017-156429 A | 9/2017 |
| JP | 2017-156430 A | 9/2017 |
| JP | 2017-156431 A | 9/2017 |
| JP | 2018-146607 A | 9/2018 |
| JP | 2019-090194 A | 6/2019 |
| JP | 2019-152773 A | 9/2019 |
| JP | 2020-008628 A | 1/2020 |
| JP | 2020-190696 A | 11/2020 |
| JP | 2021-027030 A | 2/2021 |
| JP | 2021-067801 A | 4/2021 |
| JP | 2021-117472 A | 8/2021 |
| JP | 2021-124629 A | 8/2021 |
| JP | 2021-131425 A | 9/2021 |
| WO | 2012/026069 A1 | 3/2012 |

* cited by examiner

FIG. 1

EXAMPLE 1

INFINITY

CLOSEST

EXAMPLE 1

FIG. 4

EXAMPLE 2

EXAMPLE 2

FIG. 6

EXAMPLE 3

EXAMPLE 3

FIG. 8

EXAMPLE 4

EXAMPLE 4

EXAMPLE 5

EXAMPLE 5

FIG. 12

EXAMPLE 6

EXAMPLE 6

EXAMPLE 7

INFINITY

CLOSEST

EXAMPLE 8

EXAMPLE 8

EXAMPLE 9

EXAMPLE 9

FIG. 21

EXAMPLE 10

EXAMPLE 10

EXAMPLE 11

EXAMPLE 11

IMAGING LENS AND IMAGING APPARATUS

CROSS-REFERENCE TO RELATED APPLICATIONS

This application claims priority from Japanese Patent Application No. 2022-072610, filed on Apr. 26, 2022, the entire disclosure of which is incorporated herein by reference.

BACKGROUND OF THE INVENTION

Technical Field

A technique of the present disclosure relates to an imaging lens and an imaging apparatus.

Related Art

In the related art, as an imaging lens that can be used in an imaging apparatus such as a digital camera, imaging lenses described in JP2017-156431A and JP2018-146607A below are known.

SUMMARY

An imaging lens having favorable optical performance while being compact and lightweight is demanded. The demand level is increasing year by year.

An object of the present disclosure is to provide an imaging lens having favorable optical performance while being compact and lightweight, and an imaging apparatus comprising the imaging lens.

According to one aspect of the present disclosure, there is provided an imaging lens consisting of, in order from an object side to an image side: a first lens group that has a refractive power; a second lens group that has a positive refractive power; and a third lens group that has a negative refractive power, in which during focusing, the first lens group and the third lens group remain stationary with respect to an image plane. The second lens group moves along an optical axis, and the second lens group includes a stop and at least three negative lenses. Conditional Expression (1) is satisfied, which is represented by $$5 < TTL^2/(f^2 \times \tan \omega m) < 15 \qquad (1).$$

The symbol of Conditional Expression (1) is defined as follows. It is assumed that a sum of a distance on the optical axis from a lens surface closest to the object side in the first lens group to a lens surface closest to the image side in the third lens group and a back focal length of a whole system in terms of an air-equivalent distance is TTL. It is assumed that a focal length of the whole system in a state in which an infinite distance object is in focus is f. It is assumed that a maximum half angle of view in a state in which the infinite distance object is in focus is $\omega m$.

Assuming that the back focal length of the whole system in terms of the air-equivalent distance is Bf, it is preferable that the imaging lens according to the above-mentioned aspect satisfies Conditional Expression (2), which is represented by $$0.1 < Bf/f < 0.6 \qquad (2).$$

The first lens group may be configured as a lens group having a negative refractive power.

Assuming that a focal length of the second lens group is f2, and a focal length of the third lens group is f3, it is preferable that the imaging lens according to the above-mentioned aspect satisfies Conditional Expression (3), which is represented by $$-18.5 < f3/f2 < -1 \qquad (3).$$

Assuming that a refractive index of a positive lens closest to the object side among the positive lenses in the second lens group at a d line is N2po, and a refractive index of a positive lens closest to the image side among the positive lenses in the second lens group at the d line is N2pi, it is preferable that the imaging lens according to the above-mentioned aspect satisfies Conditional Expression (4), which is represented by $$1.86 < (N2po+N2pi)/2 < 2.2 \qquad (4).$$

Assuming that an Abbe number of a positive lens closest to the object side among the positive lenses in the second lens group at a d line is $\nu 2po$, and an Abbe number of a positive lens closest to the image side among the positive lenses in the second lens group at the d line is $\nu 2pi$, it is preferable that the imaging lens according to the above-mentioned aspect satisfies Conditional Expression (5), which is represented by $$15 < (\nu 2po+\nu 2pi)/2 < 40 \qquad (5).$$

Assuming that a focal length of the first lens group is f1, and a focal length of the third lens group is f3, it is preferable that the imaging lens according to the above-mentioned aspect satisfies Conditional Expression (6), which is represented by $$1.5 < f3/f1 < 3.5 \qquad (6).$$

Assuming that a focal length of the whole system in a state where an infinite distance object is in focus is f, and a focal length of the first lens group is f1, it is preferable that the imaging lens according to the above-mentioned aspect satisfies Conditional Expression (7), which is represented by $$-0.35 < f/f1 < -0.08 \qquad (7).$$

It is preferable that a positive lens closest to the image side among the positive lenses in the second lens group is cemented to a negative lens.

It is preferable that a positive lens closest to the object side among the positive lenses in the second lens group is a meniscus lens of which an image side surface is concave.

It is preferable that the second lens group includes at least one aspherical lens surface. It is preferable that the third lens group includes at least one aspherical lens surface.

It is preferable that the third lens group includes a cemented lens which is formed by cementing a positive lens and a negative lens in order from the object side, and a negative lens which is disposed closest to the image side and of which an object side surface is concave. In such a configuration, assuming that an Abbe number of the positive lens of the cemented lens of the third lens group at a d line is $\nu 3p$, and an Abbe number of the negative lens of the cemented lens of the third lens group at the d line is $\nu 3n$, it is preferable that the imaging lens according to the above-mentioned aspect satisfies Conditional Expression (8), which is represented by $$1 < \nu 3p - \nu 3n < 10 \qquad (8).$$

Assuming that a distance on the optical axis from a lens surface closest to the object side in the third lens group to the lens surface closest to the image side in the third lens group is DG3, and the back focal length of the whole system in terms of the air-equivalent distance is Bf, it is preferable that the imaging lens according to the above-mentioned aspect satisfies Conditional Expression (9), which is represented by $$0.85 < DG3/Bf < 2 \qquad (9).$$

A lens closest to the object side in the first lens group may be configured as a negative lens of which an object side surface is concave. In such a configuration, it is preferable that a positive lens is disposed adjacent to the image side of the negative lens closest to the object side in the first lens group. In a case where the positive lens is disposed adjacent to the image side of the negative lens closest to the object side in the first lens group, it is preferable that the negative lens closest to the object side in the first lens group is a biconcave lens.

According to another aspect of the present disclosure, there is provided an imaging apparatus comprising the imaging lens according to the aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

The term "~ group that has a positive refractive power" in the present specification means that the group has a positive refractive power as a whole. Similarly, the term "group that has a negative refractive power" means that the group has a negative refractive power as a whole. The term "a lens that has a positive refractive power" and the term "a positive lens" are synonymous. The term "a lens that has a negative refractive power" and the term "negative lens" are synonymous. In the present specification, the terms "first lens group", and "third lens group" are not limited to a configuration consisting of a plurality of lenses, but may be a configuration consisting of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power, and the surface shape of the lens including the aspherical surface will be used in terms of the paraxial region unless otherwise specified.

The term "the whole system" of the present specification means an imaging lens. The "focal length" used in a conditional expression is a paraxial focal length. Unless otherwise specified, the "distance on the optical axis" used in Conditional Expression is considered as a geometrical distance. The values used in the conditional expressions are values in a case where the d line is used as a reference in a state where the infinite distance object is in focus unless otherwise specified. The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

According to the present disclosure, it is possible to provide an imaging lens having favorable optical performance while being compact and lightweight, and an imaging apparatus comprising the imaging lens.

BRIEF DESCRIPTION OF THE DRAWINGS

FIG. 1 is a cross-sectional view showing a configuration of an imaging lens according to an embodiment, which corresponds to the imaging lens of Example 1.

FIG. 4 is a cross-sectional view showing a configuration of an imaging lens of Example 2.

FIG. 6 is a cross-sectional view showing a configuration of an imaging lens of Example 3.

FIG. 8 is a cross-sectional view showing a configuration of an imaging lens of Example 4.

FIG. 12 is a cross-sectional view showing a configuration of an imaging lens of Example 6.

FIG. 21 is a cross-sectional view showing a configuration of an imaging lens of Example 10.

DESCRIPTION OF EMBODIMENTS

Hereinafter, embodiments of the present disclosure will be described with reference to the accompanying drawings.

Figure 1:
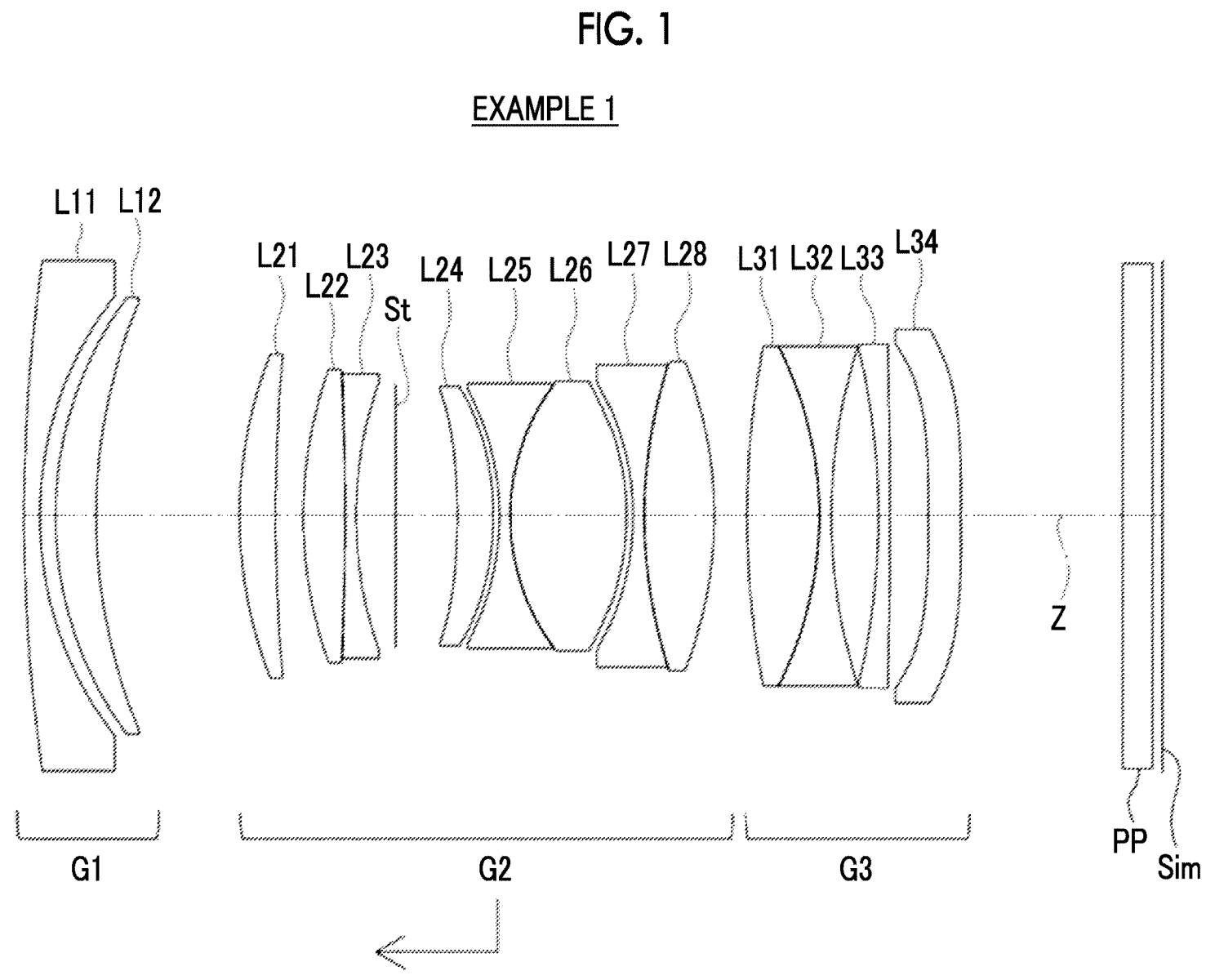
Figure 2:
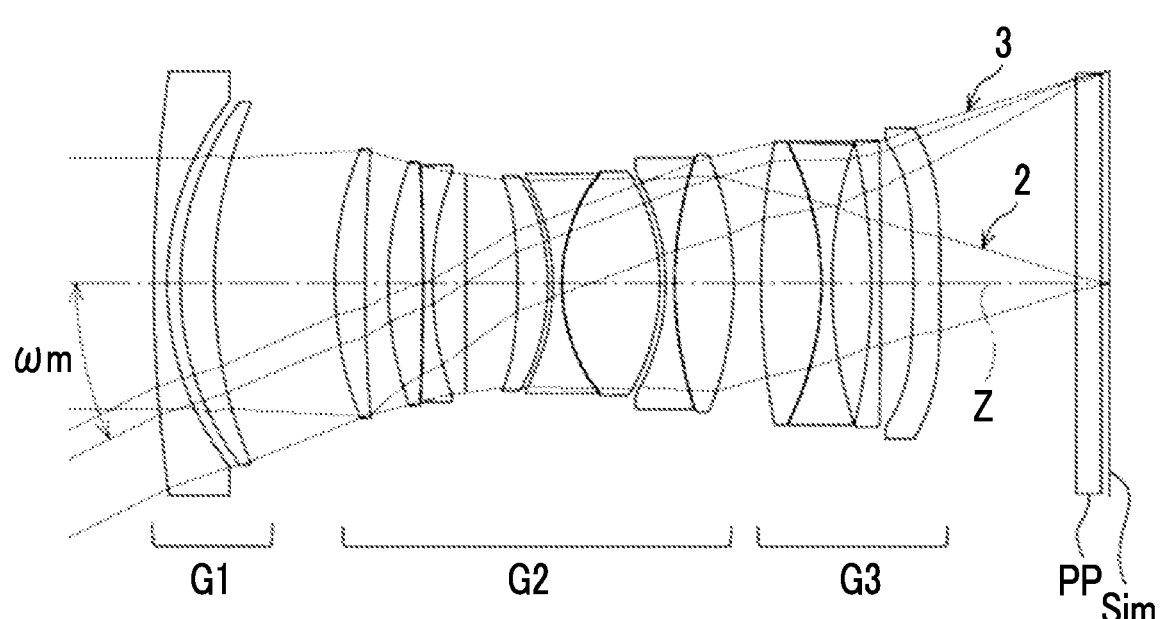
FIG. 2 is a cross-sectional view showing a configuration and luminous flux in each in-focus state of the imaging lens of FIG. 1.
Figure 2:
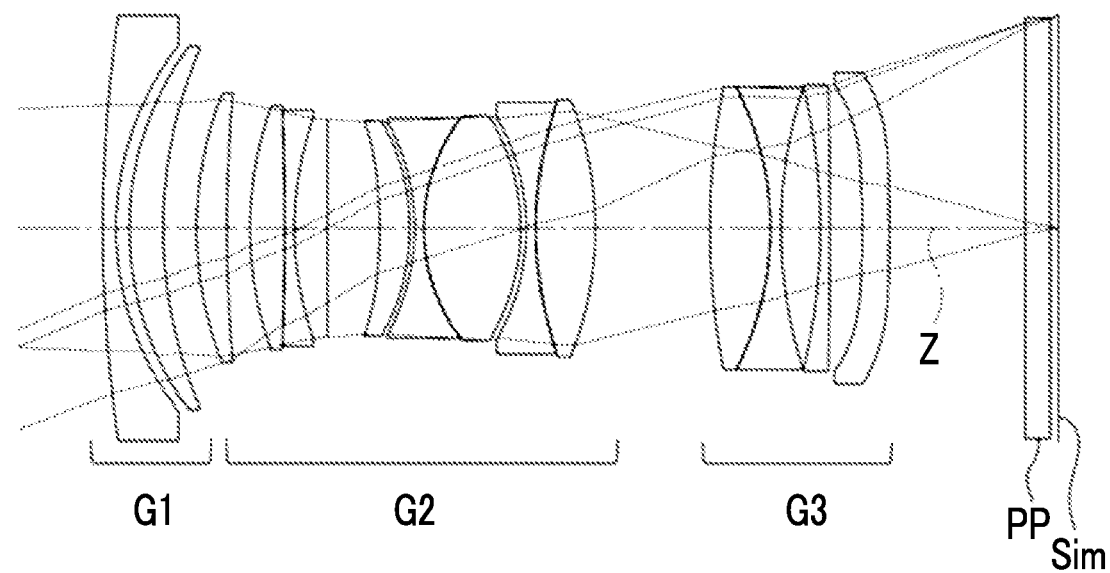

FIG. 1 shows a cross-sectional view of the configuration of the imaging lens according to the embodiment of the present disclosure in a state in which the infinite distance object is in focus. FIG. 2 shows a cross-sectional view showing a configuration and luminous flux in each in-focus state of the imaging lens of FIG. 1. In FIG. 2, the upper part labeled "INFINITY" shows a state in which the infinite distance object is in focus, and the lower part labeled "CLOSEST" shows a state in which a closest object at a distance of 0.3 meters (m) from the lens surface closest to the object side is in focus. In the present specification, an object at an infinite distance is referred to as the "infinite distance object", and an object at the closest distance is referred to as the "closest object". The upper part of FIG. 2 shows, as the luminous flux, an on-axis luminous flux 2 and a luminous flux 3 having a maximum half angle of view ωm in a state in which the infinite distance object is in focus. The lower part of FIG. 2 shows, as the luminous flux, an on-axis luminous flux and a luminous flux having a maximum half angle of view in a state in which the closest object is in focus. The examples shown in FIGS. 1 and 2 correspond to the imaging lens of Example 1 to be described later. In FIGS. 1 and 2, the left side is the object side and the right side is the image side. Hereinafter, description thereof will be given mainly with reference to FIG. 1.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens of the present disclosure consists of, in order from the object side to the image side along the optical axis Z, a first lens group G1 that has a refractive power, a second lens group G2 that has a positive refractive power, and a third lens group G3 that has a negative refractive power. During focusing, the first lens group G1 and the third lens group G3 remain stationary with respect to the image plane Sim, and the second lens group G2 moves along the optical axis Z. In the present specification, a group which moves along the optical axis Z during focusing is referred to as a focus group. Focusing is performed by moving the focus group. In the imaging lens according to the embodiment of the present disclosure, the second lens group G2 is a focus group.

The configuration in which the first lens group G1 remains stationary during focusing is advantageous in dust-proof property and drip-proof property. In a configuration in which the third lens group G3 remains stationary during focusing, the third lens group G3 moves relative to the second lens group G2 during focusing. Therefore, it is possible to effectively suppress fluctuation in field curvature caused by the focusing. By making a configuration in which only the second lens group G2 moves during focusing, as compared with a configuration in which the other groups move together with the second lens group G2, it is possible to achieve reduction in size and weight of the focus group, and it is possible to reduce the load on the driving system.

The second lens group G2 and the third lens group G3 have refractive powers having signs different from each other. Since the third lens group G3 has a negative refractive power, the positive refractive power of the second lens group G2 can be increased. Therefore, the amount of movement of the focus group during focusing can be decreased, and this is able to contribute to an increase in speed of focusing. The sign of the refractive power of the first lens group G1 may be negative or may be positive. In a case where the first lens group G1 is configured as a lens group that has a negative refractive power, there is an advantage in achieving wide angle. In a case where the first lens group G1 is configured as a lens group that has a positive refractive power, there is an advantage in achieving reduction in size.

For example, the lens groups of the imaging lens of FIG. 1 are configured as follows. The first lens group G1 consists of two lenses L11 and L12, in order from the object side to the image side. The second lens group G2 consists of three lenses L21 to L23, an aperture stop St, and five lenses L24 to L28, in order from the object side to the image side. It should be noted that the aperture stop St in FIG. 1 does not indicate a size and a shape, but indicates a position in an optical axis direction. The third lens group G3 consists of four lenses L31 to L34, in order from the object side to the image side. The arrow pointing to the left below the second lens group G2 in FIG. 1 indicates that the second lens group G2 is a focus group moving toward the object side during focusing from the infinite distance object to the closest object.

It should be noted that the term "lens group" in the present specification refers to a part including at least one lens, which is a constituent part of the imaging lens and is divided by an air spacing that changes during focusing. During focusing, each lens group moves or remains stationary, and the mutual spacing between the lenses in each lens group does not change. That is, in the present specification, one lens group is a group in which the spacing between adjacent groups changes during focusing and the total spacing between adjacent lenses does not change within itself.

It is preferable that the first lens group G1 includes one negative lens and one positive lens. In such a case, there is an advantage in correcting chromatic aberration. The first lens group G1 may be configured to consist of one negative lens and one positive lens. In such a case, there is an advantage in correcting chromatic aberration and reduction in size.

It is preferable that the second lens group G2 includes an aperture stop St and at least three negative lenses. A configuration in which the second lens group G2 includes the aperture stop St is advantageous for reduction in size in a radial direction, as compared with a configuration in which the first lens group G1 or the third lens group G3 includes the aperture stop St. The including of at least three negative lenses in the second lens group G2 is advantageous for favorable correction of various aberrations.

A positive lens closest to the object side among the positive lenses in the second lens group G2 may be configured as a meniscus lens of which an image side surface is concave. In such a case, there is an advantage in suppressing occurrence of spherical aberration.

It is preferable that a positive lens closest to the image side among the positive lenses in the second lens group G2 is cemented to a negative lens. By forming the cemented lens with these positive lenses and negative lenses, it is possible to effectively correct longitudinal chromatic aberration while reducing the thickness of the second lens group G2 on the optical axis.

It is preferable that the second lens group G2 includes at least one aspherical lens surface. By using an aspherical surface for the second lens group G2, it is possible to effectively correct spherical aberration.

It is preferable that the third lens group G3 includes a cemented lens which is formed by cementing a positive lens and a negative lens in order from the object side, and a negative lens which is disposed closest to the image side and of which an object side surface is concave. By disposing the cemented lens in the third lens group G3 in which the height of the off-axis luminous flux from the optical axis Z is high, it is possible to satisfactorily correct lateral chromatic aberration while achieving reduction in thickness of the third lens group G3 on the optical axis. Further, by disposing the negative lens concave toward the object side closest to the image side, the Petzval sum is reduced. As a result, there is an advantage in suppressing occurrence of field curvature.

It is preferable that the third lens group G3 includes at least one aspherical lens surface. By using an aspherical surface for the third lens group G3, fluctuation in field curvature and distortion caused by focusing can be effectively suppressed.

Hereinafter, preferable configurations of the imaging lens of the present disclosure relating to conditional expressions will be described. In the following description of the conditional expressions, the "imaging lens of the present disclosure" is simply referred to as an "imaging lens" in order to avoid redundancy.

It is preferable that the imaging lens satisfies Conditional Expression (1). Here, it is assumed that a sum of a distance on the optical axis from a lens surface closest to the object side in the first lens group G1 to a lens surface closest to the image side in the third lens group G3 and a back focal length of a whole system at an air-equivalent distance is TTL. It is assumed that a focal length of the whole system in a state in which the infinite distance object is in focus is f. It is assumed that a maximum half angle of view in a state in which the infinite distance object is in focus is ωm. tan of Conditional Expression (1) is a tangent. By not allowing the corresponding value of Conditional Expression (1) to be equal to or less than the lower limit, there is an advantage in ensuring favorable optical performance. By not allowing the corresponding value of Conditional Expression (1) to be equal to or greater than the upper limit, there is an advantage in achieving reduction in size of the lens system. In particular, there is an advantage in constructing a lens system having a short total optical length with respect to the image size. In order to obtain more favorable characteristics, it is more preferable that the imaging lens satisfies Conditional Expression (1-1), and it is yet more preferable that the imaging lens satisfies Conditional Expression (1-2).

$$5 < TTL^2/(f^2 \times \tan \omega m) < 15 \tag{1}$$

$$7.2 < TTL^2/(f^2 \times \tan \omega m) < 11.8 \tag{1-1}$$

$$8 < TTL^2/(f^2 \times \tan \omega m) < 10 \tag{1-2}$$

Assuming that the back focal length of the whole system at the air-equivalent distance is Bf, and a focal length of the whole system in a state where the object at infinity is in focus is f, it is preferable that the imaging lens satisfies Conditional Expression (2). By not allowing the corresponding value of Conditional Expression (2) to be equal to or less than the lower limit, there is an advantage in ensuring an appropriate back focal length. In particular, there is an advantage in ensuring the back focal length in a case where the imaging lens is applied as an interchangeable lens. By not allowing the corresponding value of Conditional Expression (2) to be equal to or greater than the upper limit, there is an advantage in achieving reduction in total optical length. In order to obtain more favorable characteristics, it is more preferable that the imaging lens satisfies Conditional Expression (2-1), and it is yet more preferable that the imaging lens satisfies Conditional Expression (2-2).

$$0.1 < Bf/f < 0.6 \tag{2}$$

$$0.2 < Bf/f < 0.5 \tag{2-1}$$

$$0.3 < Bf/f < 0.45 \tag{2-2}$$

Assuming that a focal length of the second lens group G2 is f2 and a focal length of the third lens group G3 is f3, it is preferable that the imaging lens satisfies Conditional Expression (3). By not allowing the corresponding value of Conditional Expression (3) to be less than or equal to the lower limit, the refractive power of the second lens group G2 is prevented from becoming excessively strong. As a result, there is an advantage in simultaneously correcting spherical aberration and field curvature caused by focusing. By not allowing the corresponding value of Conditional Expression (3) to be equal to or greater than the upper limit, the refractive power of the third lens group G3 is prevented from becoming excessively strong. As a result, it is possible to suppress rapid change in angles of the ray incident into the third lens group G3 and the ray emitted from the third lens group G3. Thereby, there is an advantage in suppressing breathing. In order to obtain more favorable characteristics, it is more preferable that the imaging lens satisfies Conditional Expression (3-1), and it is yet more preferable that the imaging lens satisfies Conditional Expression (3-2).

$$-18.5 < f3/f2 < -1 \tag{3}$$

$$-17.5 < f3/f2 < -7 \tag{3-1}$$

$$-16.5 < f3/f2 < -8 \tag{3-2}$$

It is preferable that the imaging lens satisfies Conditional Expression (4). Here, it is assumed that a refractive index of the positive lens closest to the object side among the positive lenses in the second lens group G2 at the d line is N2po. It is assumed that a refractive index of a positive lens closest to the image side among the positive lenses in the second lens group G2 at the d line is N2pi. By not allowing the corresponding value of Conditional Expression (4) to be less than or equal to the lower limit, the absolute value of the curvature radius of the positive lens, which requires a particularly strong refractive power, is prevented from becoming excessively small. As a result, there is an advantage in reducing spherical aberration. Further, since it is easy to suppress the Petzval sum, there is an advantage in reducing field curvature. In general, an optical material having a high refractive index has a small Abbe number. Thus, by not allowing the corresponding value of Conditional Expression (4) from being equal to or greater than the upper limit, it is easy to select a material having an appropriate Abbe number. As a result, there is an advantage in correcting longitudinal chromatic aberration. In order to obtain more favorable characteristics, it is more preferable that the imaging lens satisfies Conditional Expression (4-1), and it is yet more preferable that the imaging lens satisfies Conditional Expression (4-2).

$$1.86 < (N2po+N2pi)/2 < 2.2 \tag{4}$$

$$1.9 < (N2po+N2pi)/2 < 2.15 \tag{4-1}$$

$$1.92 < (N2po+N2pi)/2 < 2.1 \tag{4-2}$$

It is preferable that the imaging lens satisfies Conditional Expression (5). Here, it is assumed that an Abbe number of the positive lens closest to the object side among the positive lenses in the second lens group G2 at the d line is ν2po. Here, it is assumed that an Abbe number of a positive lens closest to the image side among the positive lenses in the second lens group G2 at the d line is ν2pi. By not allowing the corresponding value of Conditional Expression (5) to be equal to or less than the lower limit, occurrence of longitudinal chromatic aberration can be suppressed. As a result, there is an advantage in the correction of longitudinal chromatic aberration and other aberrations. By not allowing the corresponding value of Conditional Expression (5) to be equal to or greater than the upper limit, it is easy to select an appropriate material. In order to obtain more favorable characteristics, it is more preferable that the imaging lens satisfies Conditional Expression (5-1), and it is yet more preferable that the imaging lens satisfies Conditional Expression (5-2).

$$15<(v2po+v2pi)/2<40 \qquad (5)$$

$$20<(v2po+v2pi)/2<35 \qquad (5\text{-}1)$$

$$25<(v2po+v2pi)/2<30 \qquad (5\text{-}2)$$

Assuming that a focal length of the first lens group G1 is f1 and a focal length of the third lens group G3 is f3, it is preferable that the imaging lens satisfies Conditional Expression (6). By not allowing the corresponding value of Conditional Expression (6) to be equal to or less than the lower limit, the negative refractive power of the first lens group G1 is prevented from becoming excessively weak. Therefore, the positive refractive power of the second lens group G2 is prevented from becoming relatively excessively weak. Thereby, the amount of movement of the focus group during focusing can be suppressed. As a result, there is an advantage in achieving reduction in size. By not allowing the corresponding value of Conditional Expression (6) to be equal to or greater than the upper limit, the negative refractive power of the first lens group G1 is prevented from becoming excessively strong. Therefore, it is possible to suppress an increase in total optical length. Further, by not allowing the corresponding value of Conditional Expression (6) to be equal to or greater than the upper limit, the negative refractive power of the first lens group G1 is prevented from becoming excessively strong. Therefore, the positive refractive power of the second lens group G2 is prevented from becoming relatively excessively strong. Thereby, it is possible to suppress rapid change in angles of the ray incident on the second lens group G2 and the ray emitted from the second lens group G2. As a result, there is an advantage in suppressing breathing. In order to obtain more favorable characteristics, it is more preferable that the imaging lens satisfies Conditional Expression (6-1), and it is yet more preferable that the imaging lens satisfies Conditional Expression (6-2).

$$1.5<f3/f1<3.5 \qquad (6)$$

$$1.6<f3/f1<3.4 \qquad (6\text{-}1)$$

$$1.7<f3/f1<3.3 \qquad (6\text{-}2)$$

Assuming that a focal length of the whole system in a state where the infinite distance object is in focus is f and a focal length of the first lens group G1 is f1, it is preferable that the imaging lens satisfies Conditional Expression (7). By not allowing the corresponding value of Conditional Expression (7) to be equal to or less than the lower limit, the negative refractive power of the first lens group G1 is prevented from becoming excessively strong. Therefore, it is possible to suppress an increase in total optical length. Further, by not allowing the corresponding value of Conditional Expression (7) to be equal to or less than the lower limit, the negative refractive power of the first lens group G1 is prevented from becoming excessively strong. Therefore, the positive refractive power of the second lens group G2 is prevented from becoming relatively excessively strong. Thereby, it is possible to suppress rapid change in angles of the ray incident on the second lens group G2 and the ray emitted from the second lens group G2. As a result, there is an advantage in suppressing breathing. By not allowing the corresponding value of Conditional Expression (7) to be equal to or greater than the upper limit, the negative refractive power of the first lens group G1 is prevented from becoming excessively weak. Therefore, the positive refractive power of the second lens group G2 is prevented from becoming relatively excessively weak. Thereby, the amount of movement of the focus group during focusing can be suppressed. As a result, there is an advantage in achieving reduction in size. In order to obtain more favorable characteristics, it is more preferable that the imaging lens satisfies Conditional Expression (7-1), and it is yet more preferable that the imaging lens satisfies Conditional Expression (7-2).

$$-0.35<f/f1<-0.08 \qquad (7)$$

$$-0.32<f/f1<-0.11 \qquad (7\text{-}1)$$

$$-0.28<f/f1<-0.15 \qquad (7\text{-}2)$$

In a configuration in which the third lens group G3 includes a cemented lens which is formed by cementing a positive lens and a negative lens in order from the object side, it is preferable that the imaging lens satisfies Conditional Expression (8). Here, it is assumed that an Abbe number of the positive lens of the cemented lens of the third lens group G3 based on the d line is v3p and an Abbe number of the negative lens of the cemented lens of the third lens group G3 based on the d line is v3n. By not allowing the corresponding value of Conditional Expression (8) to be equal to or less than the lower limit, it is possible to obtain the effect of correcting longitudinal chromatic aberration without reducing the absolute value of the curvature radius of the cemented surface of the cemented lens of the third lens group G3. In general, in a case where the absolute value of the curvature radius of the lens surface is excessively small, spherical aberration is deteriorated. That is, by not allowing the corresponding value of Conditional Expression (8) to be equal to or less than the lower limit thereof, it is possible to obtain the effect of correcting longitudinal chromatic aberration without deteriorating spherical aberration. In general, an optical material having a large Abbe number has a low refractive index. Therefore, by not allowing the corresponding value of Conditional Expression (8) from becoming equal to or greater than the upper limit, it is easy to select a material having a refractive index appropriate for the positive lens of the cemented lens. Thereby, the absolute value of the curvature radius of the lens surface of the positive lens in contact with the air is prevented from becoming excessively small. As a result, there is an advantage in preventing deterioration of spherical aberration and maintaining favorable performance. In order to obtain more favorable characteristics, it is more preferable that the imaging lens satisfies Conditional Expression (8-1), and it is yet more preferable that the imaging lens satisfies Conditional Expression (8-2).

$$1<v3p-v3n<10 \qquad (8)$$

$$2.5<v3p-v3n<8 \qquad (8\text{-}1)$$

$$4<v3p-v3n<6 \qquad (8\text{-}2)$$

It is preferable that the imaging lens satisfies Conditional Expression (9). Here, it is assumed that a distance on the optical axis from the lens surface closest to the object side in the third lens group G3 to the lens surface closest to the image side in the third lens group G3 is DG3. It is assumed that the back focal length in terms of the air-equivalent distance of the whole system is Bf. By not allowing the corresponding value of Conditional Expression (9) to be equal to or less than the lower limit, it is easy to ensure the thickness of the third lens group G3 on the optical axis necessary for the correction of the aberration. As a result, there is an advantage in reducing fluctuation in aberration caused by focusing. By not allowing the corresponding value of Conditional Expression (9) to be equal to or greater than the upper limit, the thickness of the third lens group G3 on the optical axis is prevented from becoming excessively increased. As a result, there is an advantage in achieving reduction in size. In order to obtain more favorable characteristics, it is more preferable that the imaging lens satisfies Conditional Expression (9-1), and it is yet more preferable that the imaging lens satisfies Conditional Expression (9-2).

$$0.85 < DG3/Bf < 2 \qquad (9)$$

$$0.88 < DG3/Bf < 1.7 \qquad (9\text{-}1)$$

$$0.9 < DG3/Bf < 1.4 \qquad (9\text{-}2)$$

The example shown in FIG. 1 is an example, and various modifications can be made without departing from the scope of the technique according to the embodiment of the present disclosure. For example, the number of lens groups constituting the imaging lens and the number of lenses included in each lens group may be different from the number of the example of FIG. 1. Further, the shape of the lens included in each lens group may also be different from the shape shown in the example of FIG. 1.

For example, in the example of FIG. 1, the object side surface of the lens closest to the object side in the first lens group G1 is a convex surface. However, in the technique of the present disclosure, the lens closest to the object side in the first lens group G1 may be configured as a negative lens of which an object side surface is concave. In such a case, there is an advantage in correcting mostly field curvature. In a case where the lens closest to the object side in the first lens group G1 is a negative lens of which an object side surface is concave, it is preferable that the lens which is the second from the object side in the first lens group G1 is a positive lens. By disposing the positive lens adjacent to the image side of the negative lens closest to the object side in the first lens group G1, there is an advantage in suppressing occurrence of spherical aberration. Further, in a case where the lens which is the second from the object side of the first lens group G1 is a positive lens, it is preferable that the negative lens disposed closest to the object side in the first lens group G1 is a biconcave lens. The image side surface of the lens closest to the object side in the first lens group G1 is a surface facing the positive lens. By making the facing surface concave, there is an advantage in correcting chromatic aberration.

The lens groups of the imaging lens of the present disclosure may be configured as follows.

The first lens group G1 may be configured to consist of two lenses. The first lens group G1 may be configured to consist of a negative lens and a positive lens, in order from the object side to the image side. In such a case, the negative lens of the first lens group G1 may be a meniscus lens convex toward the object side or may be a biconcave lens, and the positive lens of the first lens group G1 may be a meniscus lens convex toward the object side or may be a biconvex lens. Further, in a case where the first lens group G1 consists of a negative lens and a positive lens in order from the object side to the image side, the negative and positive lenses may be configured as a single lens.

The first lens group G1 may be configured to include an aspherical lens. In a case where the first lens group G1 includes an aspherical lens, the lens closest to the image side in the first lens group G1 may be configured as an aspherical lens. By forming a lens having a relatively small diameter in the first lens group G1 as an aspherical lens, it is easy to satisfactorily correct various aberrations while reducing the costs.

The second lens group G2 may be configured to consist of five positive lenses, three negative lenses, and an aperture stop St. For example, the second lens group G2 may be configured to consist of a positive lens, a cemented lens, an aperture stop St, a positive lens, a cemented lens, and a cemented lens, in order from the object side to the image side. In such a case, the cemented lens of the second lens group G2 closer to the object side than the aperture stop St may be configured such that the positive lens and the negative lens are cemented in order from the object side, and may be configured such that the negative lens and the positive lens are cemented in order from the object side. Further, each of the two cemented lenses of the second lens group G2 closer to the image side than the aperture stop St may be configured such that the negative lens and the positive lens are cemented in order from the object side.

The second lens group G2 may be configured to consist of five positive lenses, four negative lenses, and an aperture stop St. For example, the second lens group G2 may be configured to consist of a positive lens, a cemented lens, an aperture stop St, a negative lens, a cemented lens, and a cemented lens, in order from the object side to the image side. In such a case, the cemented lens of the second lens group G2 closer to the object side than the aperture stop St may be configured such that a positive lens, a negative lens, and a positive lens are cemented to each other. Further, each of the two cemented lenses of the second lens group G2 closer to the image side than the aperture stop St may be configured such that the negative lens and the positive lens are cemented in order from the object side.

The second lens group G2 may be configured to consist of four positive lenses, four negative lenses, and an aperture stop St. For example, the second lens group G2 may be configured to consist of a positive lens, a cemented lens, an aperture stop St, a negative lens, a cemented lens, and a cemented lens, in order from the object side to the image side. In such a case, the cemented lens of the second lens group G2 closer to the object side than the aperture stop St may be configured such that the positive lens and the negative lens are cemented in order from the object side. Further, each of the two cemented lenses of the second lens group G2 closer to the image side than the aperture stop St may be configured such that the negative lens and the positive lens are cemented in order from the object side.

Alternatively, in a case where the second lens group G2 consists of the four positive lenses, the four negative lenses, and the aperture stop St, the second lens group G2 may be configured to consist of a cemented lens, an aperture stop St, a cemented lens, a negative lens, a positive lens, and a cemented lens, in order from the object side to the image side. In such a case, the cemented lens of the second lens group G2 closer to the object side than the aperture stop St may be configured such that the positive lens and the negative lens are cemented in order from the object side. Further, each of the two cemented lenses of the second lens group G2 closer to the image side than the aperture stop St may be configured such that the negative lens and the positive lens are cemented in order from the object side.

In a case where the single lens is disposed adjacent to the image side of the aperture stop St in the second lens group G2, the single lens may be configured as an aspherical lens.

In such a manner, spherical aberration can be effectively corrected by forming the lens in the vicinity of the aperture stop St as an aspherical lens.

The third lens group G3 may be configured to consist of four lenses. For example, the third lens group G3 may be configured to consist of one positive lens and three negative lenses. The third lens group G3 may be configured to consist of a cemented lens, a negative lens, and a negative lens, in order from the object side to the image side. In such a case, the cemented lens of the third lens group G3 may be configured such that the positive lens and the negative lens are cemented in order from the object side.

The third lens group G3 may be configured to consist of three lenses. For example, the third lens group G3 may be configured to consist of one positive lens and two negative lenses. The third lens group G3 may be configured to consist of a cemented lens and a negative lens in order from the object side to the image side. In such a case, the cemented lens of the third lens group G3 may be configured such that the positive lens and the negative lens are cemented in order from the object side.

Alternatively, in a case where the third lens group G3 consists of three lenses, the third lens group G3 may be configured to consist of two positive lenses and one negative lens. The third lens group G3 may be configured to consist of a positive lens and a cemented lens, in order from the object side to the image side. In such a case, the cemented lens of the third lens group G3 may be configured such that the negative lens and the positive lens are cemented in order from the object side.

In a case where the single lens is disposed closest to the image side in the third lens group G3, the single lens may be configured as an aspherical lens. In a case where the single lens is not disposed closest to the image side in the third lens group G3, a single lens closest to the image side among single lenses of the third lens group G3 may be configured as an aspherical lens. In the third lens group G3, the off-axis ray and the on-axis ray are separated toward the image side. Thus, various aberrations can be effectively corrected by using a lens closer to the image side as an aspherical lens. In particular, the off-axis aberration can be effectively corrected.

The above-mentioned preferred configurations and available configurations may be optional combinations, and it is preferable to selectively adopt the configurations in accordance with required specification. It should be noted that the conditional expressions that the imaging lens of the present disclosure preferably satisfies are not limited to the conditional expressions described in the form of expression, and the lower limit and the upper limit are selected from the preferable, more preferable, and yet more preferable conditional expressions. The conditional expressions may include all conditional expressions obtained through optional combinations.

For example, according to a preferred embodiment of the imaging lens of the present disclosure, the imaging lens consists of a first lens group G1 that has a refractive power, a second lens group G2 that has a positive refractive power, and a third lens group G3 that has a negative refractive power, in order from the object side to the image side. During focusing, the first lens group G1 and the third lens group G3 remain stationary with respect to the image plane Sim, and the second lens group G2 moves along the optical axis Z. The second lens group G2 includes the aperture stop St and at least three negative lenses, and satisfies Conditional Expression (1).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, components do not necessarily have a common configuration.

Example 1

FIG. 1 is a cross-sectional view of a configuration of an imaging lens of Example 1, and an illustration method and a configuration thereof are as described above. Therefore, some description is not repeated herein. The imaging lens of Example 1 consists of, in order from the object side to the image side, a first lens group G1 that has a negative refractive power, a second lens group G2 that has a positive refractive power, and a third lens group G3 that has a negative refractive power. During focusing from the infinite distance object to the closest object, the first lens group G1 and the third lens group G3 remain stationary with respect to the image plane Sim, and the second lens group G2 moves toward the object side.

Regarding the imaging lens of Example 1, Table 1 shows basic lens data, Table 2 shows specifications and variable surface spacings, and Table 3 shows aspherical coefficients thereof. The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of vd shows an Abbe number of each constituent element based on the d line.

In the table of basic lens data, the sign of the curvature radius of the convex surface facing toward the object side is positive and the sign of the curvature radius of the convex surface facing toward the image side is negative. In a cell of a surface number of a surface corresponding to the aperture stop St, the surface number and a term of (St) are noted. The table of basic lens data also shows the optical member PP. A value at the bottom cell of the column of surface spacing in the table indicates a spacing between the image plane Sim and the surface closest to the image side in the table. The symbol DD[ ] is used for each variable surface spacing during focusing, and the object side surface number of the spacing is given in [ ] and is noted in the column of surface spacing.

Table 2 shows the focal length, the back focal length in terms of air-equivalent distance, the open F number, the maximum total angle of view, and the variable surface spacing, based on the d line. [°] in the column of the maximum total angle of view indicates the unit is degrees. In Table 2, the column of "Infinity" shows values in a state in which the infinite distance object is in focus, and the column of "Closest" shows values in a state in which the closest object is in focus. However, the back focal length in terms of the air-equivalent distance shows only values in the state in which the infinite distance object is in focus. The distance on the optical axis from the closest object to the lens surface closest to the object side is shown under the term "Closest" in Table 2. In Example 1, the distance is 0.4 m (meters).

In the basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical coefficients for each aspherical surface. It should be noted that m of Am is an integer of 3 or more, and differs depending on the surface. For example, in the eleventh surface of Example 1, m=4, 6, 8, . . . , and 20. The "E±n" (n: an integer) in numerical values of the aspherical coefficients of Table 3 indicates "×10$^{±n}$". KA and Am are the aspherical coefficients in the aspherical surface expression represented by the following expression.

$$Zd=C\times h^2/\{1+(1-KA\times C^2\times h^2)^{1/2}\}+\Sigma Am\times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

|  | Example 1 | | | |
| --- | --- | --- | --- | --- |
| Sn | R | D | Nd | vd |
| 1 | 189.7752 | 1.7000 | 1.59270 | 35.45 |
| 2 | 38.4658 | 1.6800 | | |

TABLE 1-continued

|  | Example 1 | | | |
| --- | --- | --- | --- | --- |
| Sn | R | D | Nd | vd |
| 3 | 39.4444 | 4.3700 | 1.95375 | 32.31 |
| 4 | 58.6361 | DD[4] | | |
| 5 | 47.1747 | 3.8800 | 2.05091 | 26.95 |
| 6 | 195.3507 | 2.9800 | | |
| 7 | 46.9048 | 4.4700 | 1.49700 | 81.61 |
| 8 | −330.2990 | 1.2200 | 1.78880 | 28.43 |
| 9 | 42.5483 | 4.2600 | | |
| 10(St) | ∞ | 6.6500 | | |
| *11 | −67.7803 | 3.8800 | 1.77210 | 49.30 |
| *12 | −29.6594 | 0.6400 | | |
| 13 | −28.4983 | 1.1700 | 1.62589 | 35.71 |
| 14 | 23.5438 | 12.4400 | 1.59283 | 68.63 |
| 15 | −27.7112 | 0.7000 | | |
| 16 | −28.8287 | 1.2300 | 1.78880 | 28.43 |
| 17 | 52.3351 | 7.5200 | 2.00069 | 25.43 |
| 18 | −44.4459 | DD[18] | | |
| 19 | 94.8433 | 7.7600 | 1.84850 | 43.79 |
| 20 | −39.6921 | 1.3600 | 1.59551 | 39.22 |
| 21 | 58.6314 | 5.0600 | | |
| 22 | −76.6425 | 1.2400 | 1.54072 | 47.23 |
| 23 | −750.3849 | 4.1100 | | |
| *24 | −299.9968 | 3.5000 | 1.68863 | 31.20 |
| *25 | −593.4954 | 17.4498 | | |
| 26 | ∞ | 3.2000 | 1.51680 | 64.20 |
| 27 | ∞ | 1.0582 | | |

TABLE 2

|  | Example 1 | |
| --- | --- | --- |
|  | Infinity | Closest 0.4 m |
| Focal length | 56.67 | 58.40 |
| Back focal length | 20.62 | |
| Open F number | 1.75 | 1.97 |
| Maximum total angle of view [°] | 52.8 | 45.2 |
| DD[4] | 15.47 | 4.28 |
| DD[18] | 3.51 | 14.70 |

TABLE 3

|  | Example 1 | | | |
| --- | --- | --- | --- | --- |
| Sn | 11 | 12 | 24 | 25 |
| KA | 1.0000000E+00 | 1.0000000E+00 | 1.0000000E+00 | 1.0000000E+00 |
| A4 | −9.7134740E−06 | −1.9062669E−06 | −2.3970257E−05 | −1.9100502E−05 |
| A6 | −1.5209098E−07 | −1.2250081E−07 | −9.8719288E−09 | −2.9730877E−08 |
| A8 | 3.5418863E−09 | 2.8717554E−09 | −2.3513245E−11 | 3.1883941E−10 |
| A10 | −5.5997685E−11 | −4.4123528E−11 | 7.9437317E−13 | −1.9712131E−12 |
| A12 | 5.5503196E−13 | 4.2981705E−13 | −6.7634995E−15 | 7.8749013E−15 |
| A14 | −3.4564182E−15 | −2.6519418E−15 | 2.8013170E−17 | −2.0296268E−17 |
| A16 | 1.3078108E−17 | 1.0024634E−17 | −5.8875024E−20 | 3.3821126E−20 |
| A18 | −2.7329980E−20 | −2.1139450E−20 | 5.6671369E−23 | −3.3769127E−23 |
| A20 | 2.3977500E−23 | 1.8963057E−23 | −1.5057050E−26 | 1.5598490E−26 |

Figure 3:
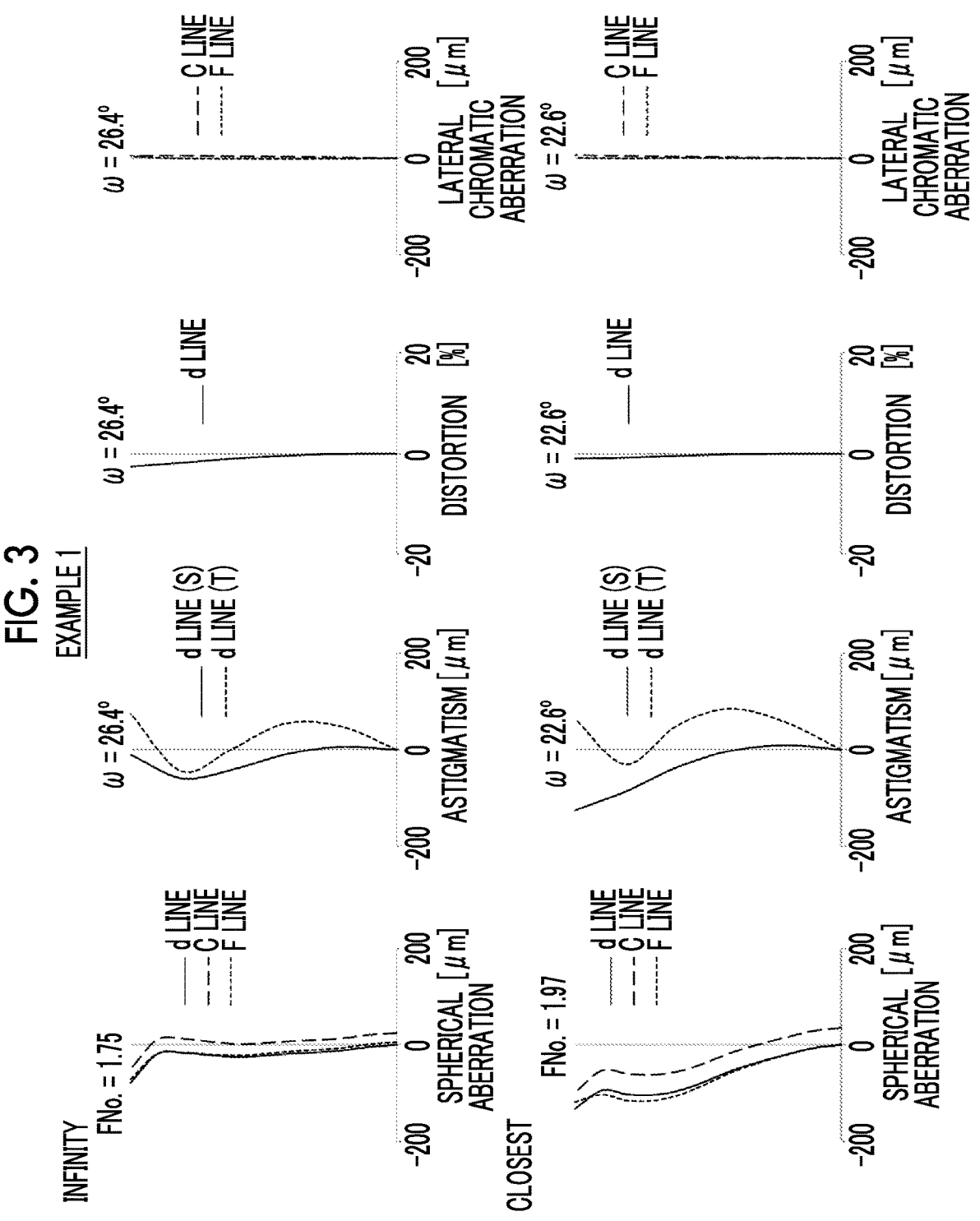
FIG. 3 is a diagram showing aberrations of the imaging lens of Example 1.

FIG. 3 shows a diagram showing aberrations of the imaging lens of Example 1. FIG. 3 shows spherical aberration, astigmatism, distortion, and lateral chromatic aberration, in order from the left side. In FIG. 3, the upper part labeled "infinity" shows aberration diagrams in a state in which the infinite distance object is in focus, and the lower part labeled "closest" shows aberration diagrams in the state in which the closest object is in focus. The distances on the optical axis from the closest object to the lens surface closest to the object side in the data of the aberration diagrams are the same as values shown in the table of specifications. In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by a solid line. In the lateral chromatic aberration diagram, aberrations at the C line, and the F line are respectively indicated by the long broken line, and the short broken line. In the spherical aberration diagram, values of the open F number in each state are shown after "FNo.=". In other aberration diagrams, values of the maximum half angle of view in each state are shown after "ω=".

Symbols, meanings, description methods, and illustration methods of the respective data pieces according to Example 1 are basically similar to those in the following examples unless otherwise specified. Therefore, in the following description, repeated description will not be given.

Example 2

Figure 4:
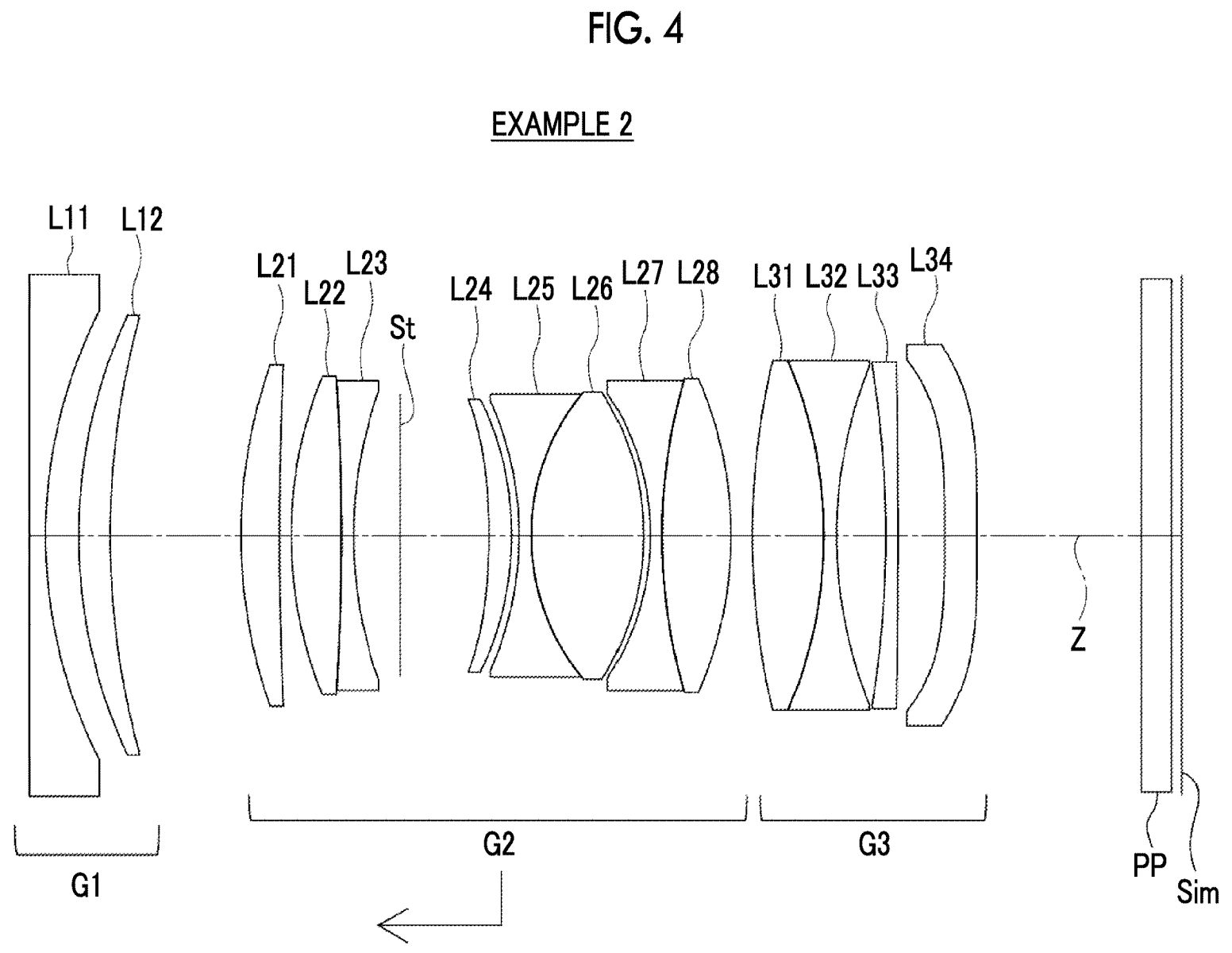

FIG. 4 is a cross-sectional view of a configuration of an imaging lens of Example 2. The imaging lens of Example 2 consists of, in order from the object side to the image side, a first lens group G1 that has a negative refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of four lenses L31 to L34, in order from the object side to the image side. During focusing from the infinite distance object to the closest object, the first lens group G1 and the third lens group G3 remain stationary with respect to the image plane Sim, and the second lens group G2 moves toward the object side.

Figure 5:
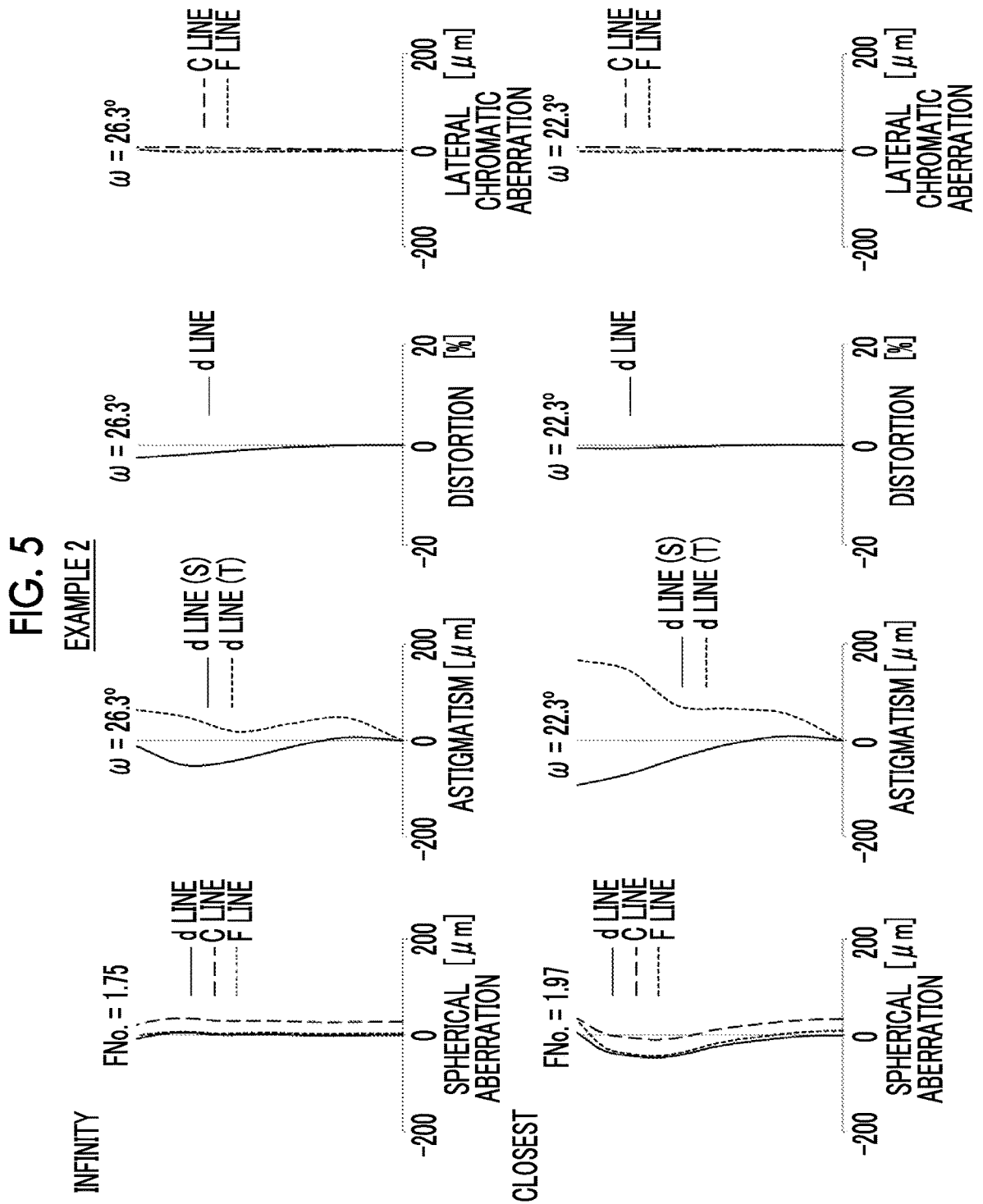
FIG. 5 is a diagram showing aberrations of the imaging lens of Example 2.

Regarding the imaging lens of Example 2, Table 4 shows basic lens data, Table 5 shows specifications and variable surface spacings, and Table 6 shows aspherical coefficients thereof. FIG. 5 shows aberration diagrams.

TABLE 4

| | | Example 2 | | |
|---|---|---|---|---|
| Sn | R | D | Nd | νd |
| 1 | −2683436.0484 | 1.7000 | 1.59551 | 39.22 |
| 2 | 52.1606 | 3.5004 | | |
| 3 | 54.7868 | 3.3143 | 1.95375 | 32.32 |
| 4 | 86.5950 | DD[4] | | |
| 5 | 54.0068 | 4.0585 | 2.05090 | 26.94 |
| 6 | 379.3274 | 1.2366 | | |
| 7 | 44.3002 | 5.3152 | 1.55032 | 75.50 |
| 8 | −258.6070 | 1.3000 | 1.78880 | 28.43 |
| 9 | 44.3711 | 4.9717 | | |
| 10(St) | ∞ | 9.3781 | | |
| *11 | −63.6932 | 2.3967 | 1.76709 | 49.20 |
| *12 | −34.8945 | 0.7845 | | |
| 13 | −34.8180 | 1.3000 | 1.63980 | 34.57 |
| 14 | 23.3870 | 11.8713 | 1.59282 | 68.62 |
| 15 | −28.3235 | 0.7021 | | |
| 16 | −27.2683 | 1.2200 | 1.78880 | 28.43 |
| 17 | 58.4149 | 7.2942 | 2.00069 | 25.46 |
| 18 | −41.3633 | DD[18] | | |
| 19 | 79.5623 | 7.5595 | 1.87070 | 40.73 |
| 20 | −46.4033 | 1.4200 | 1.61293 | 36.96 |
| 21 | 47.7818 | 5.1816 | | |
| 22 | −111.5723 | 1.3001 | 1.51742 | 52.15 |
| 23 | −1052.3824 | 4.9454 | | |
| *24 | −333.2323 | 3.3890 | 1.68948 | 31.02 |
| *25 | ∞ | 17.4405 | | |
| 26 | ∞ | 3.2000 | 1.51680 | 64.20 |
| 27 | ∞ | 1.0974 | | |

TABLE 5

| | Example 2 | |
|---|---|---|
| | Infinity | Closest 0.4 m |
| Focal length | 56.71 | 59.19 |
| Back focal length | 20.65 | |
| Open F number | 1.75 | 1.97 |
| Maximum total angle of view [°] | 52.6 | 44.6 |
| DD[4] | 13.91 | 2.02 |
| DD[18] | 2.27 | 14.16 |

TABLE 6

| | | Example 2 | | |
|---|---|---|---|---|
| Sn | 11 | 12 | 24 | 25 |
| KA | 1.0000000E+00 | 1.0000000E+00 | 1.0000000E+00 | 1.0000000E+00 |
| A4 | −1.1091221E−05 | −4.1964228E−06 | −2.7093576E−05 | −2.2645761E−05 |
| A6 | −4.6022950E−08 | −4.5023683E−08 | −6.8177977E−08 | −8.2927276E−08 |
| A8 | 1.1393622E−09 | 1.2711518E−09 | 9.5883694E−10 | 1.0710957E−09 |
| A10 | −2.1623271E−11 | −2.4905329E−11 | −8.7439882E−12 | −7.7997014E−12 |
| A12 | 2.5734564E−13 | 3.0059308E−13 | 5.0516402E−14 | 3.5709746E−14 |
| A14 | −1.8879788E−15 | −2.2136739E−15 | −1.8307996E−16 | −1.0194324E−16 |
| A16 | 8.3591694E−18 | 9.7594212E−18 | 3.9939745E−19 | 1.7448327E−19 |
| A18 | −2.0516029E−20 | −2.3703306E−20 | −4.7129950E−22 | −1.6083342E−22 |
| A20 | 2.1467541E−23 | 2.4425649E−23 | 2.2761220E−25 | 5.9854428E−26 |

Example 3

Figure 6:
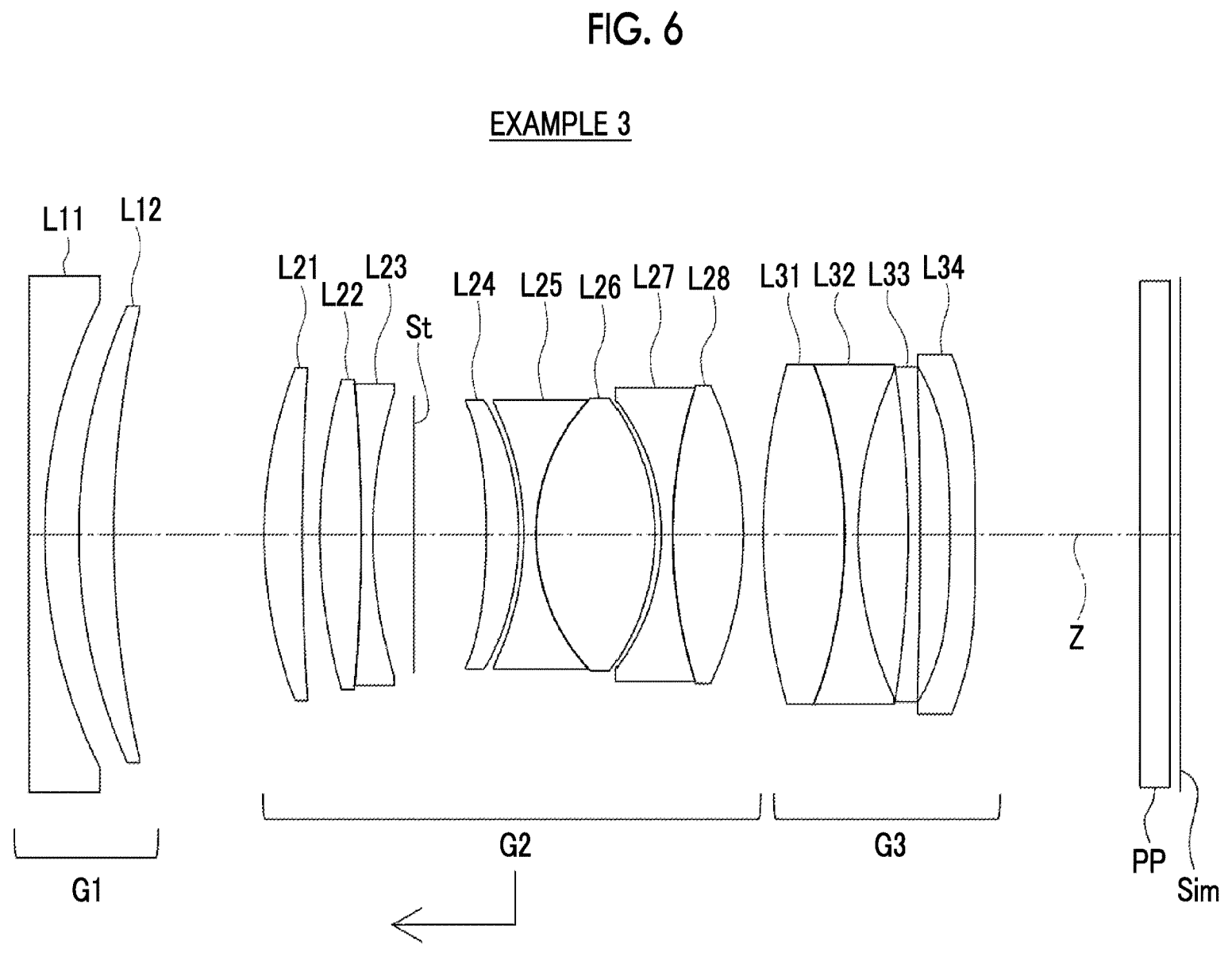

FIG. 6 is a cross-sectional view of a configuration of an imaging lens of Example 3. The imaging lens of Example 3 consists of, in order from the object side to the image side, a first lens group G1 that has a negative refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of four lenses L31 to L34, in order from the object side to the image side. During focusing from the infinite distance object to the closest object, the first lens group G1 and the third lens group G3 remain stationary with respect to the image plane Sim, and the second lens group G2 moves toward the object side.

Figure 7:
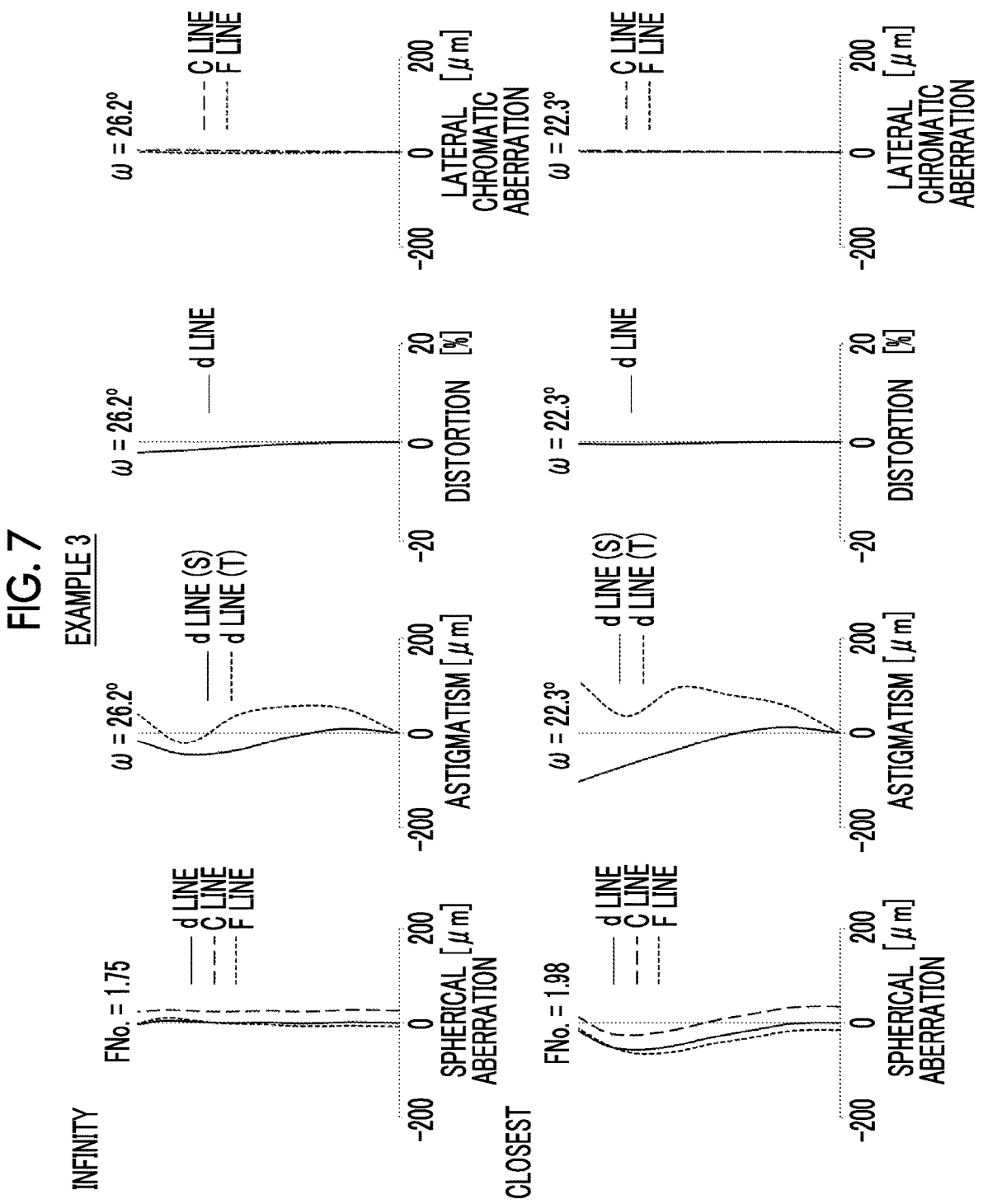
FIG. 7 is a diagram showing aberrations of the imaging lens of Example 3.

Regarding the imaging lens of Example 3, Table 7 shows basic lens data, Table 8 shows specifications and variable surface spacings, and Table 9 shows aspherical coefficients thereof. FIG. 7 shows aberration diagrams.

TABLE 7

Example 3

| Sn | R | D | Nd | vd |
|---|---|---|---|---|
| 1 | 10890.6716 | 1.7000 | 1.59270 | 35.45 |
| 2 | 55.4646 | 3.6204 | | |
| 3 | 59.8804 | 3.7388 | 1.95375 | 32.32 |
| 4 | 105.0181 | DD[4] | | |
| 5 | 48.5178 | 4.0865 | 2.05090 | 26.94 |
| 6 | 269.5101 | 1.8839 | | |
| 7 | 59.9189 | 4.4220 | 1.55032 | 75.50 |
| 8 | −184.7148 | 1.3000 | 1.78880 | 28.43 |

TABLE 7-continued

Example 3

| Sn | R | D | Nd | vd |
|---|---|---|---|---|
| 9 | 50.4160 | 4.3915 | | |
| 10(St) | ∞ | 7.7511 | | |
| *11 | −63.8786 | 3.4429 | 1.76709 | 49.20 |
| *12 | −31.8061 | 0.5532 | | |
| 13 | −32.2619 | 1.3000 | 1.59270 | 35.45 |
| 14 | 20.9700 | 12.6784 | 1.55032 | 75.50 |
| 15 | −24.3899 | 0.7002 | | |
| 16 | −23.6114 | 1.2200 | 1.78880 | 28.43 |
| 17 | 52.4159 | 7.5722 | 1.92119 | 23.96 |
| 18 | −37.3236 | DD[18] | | |
| 19 | 65.8872 | 8.7921 | 1.87070 | 40.73 |
| 20 | −49.9272 | 1.4200 | 1.59270 | 35.45 |
| 21 | 41.4305 | 5.3311 | | |
| 22 | −112.0373 | 1.3000 | 1.51742 | 52.15 |
| 23 | −521.7952 | 3.1942 | | |
| *24 | −184.9883 | 2.6988 | 1.68948 | 31.02 |
| *25 | ∞ | 17.6756 | | |
| 26 | ∞ | 3.2000 | 1.51680 | 64.20 |
| 27 | ∞ | 1.1069 | | |

TABLE 8

Example 3

| | Infinity | Closest 0.4 m |
|---|---|---|
| Focal length | 56.72 | 58.46 |
| Back focal length | 20.89 | |
| Open F number | 1.75 | 1.98 |
| Maximum total angle of view [°] | 52.4 | 44.6 |
| DD[4] | 16.14 | 3.88 |
| DD[18] | 2.10 | 14.36 |

TABLE 9

Example 3

| Sn | 11 | 12 | 24 | 25 |
|---|---|---|---|---|
| KA | 1.0000000E+00 | 1.0000000E+00 | 1.0000000E+00 | 1.0000000E+00 |
| A4 | −1.0268276E−05 | −3.2764030E−06 | −3.2738226E−05 | −2.7711425E−05 |
| A6 | 1.0054937E−08 | −1.7260697E−09 | 3.7940694E−08 | 5.1580374E−09 |
| A8 | −9.7163327E−10 | −3.4346518E−10 | −2.8463712E−10 | 3.2239054E−10 |
| A10 | 1.9966588E−11 | 6.1383813E−12 | 2.8366374E−12 | −3.0752597E−12 |
| A12 | −2.4884664E−13 | −6.7212144E−14 | −1.8493913E−14 | 1.8154324E−14 |
| A14 | 1.9156575E−15 | 4.6024758E−16 | 7.6676513E−17 | −6.7224207E−17 |
| A16 | −9.1024204E−18 | −2.0694433E−18 | −1.8910539E−19 | 1.5285685E−19 |
| A18 | 2.4286346E−20 | 5.4484028E−21 | 2.5275398E−22 | −1.9429292E−22 |
| A20 | −2.8150671E−23 | −6.4892015E−24 | −1.4103085E−25 | 1.0530608E−25 |

Example 4

Figure 8:
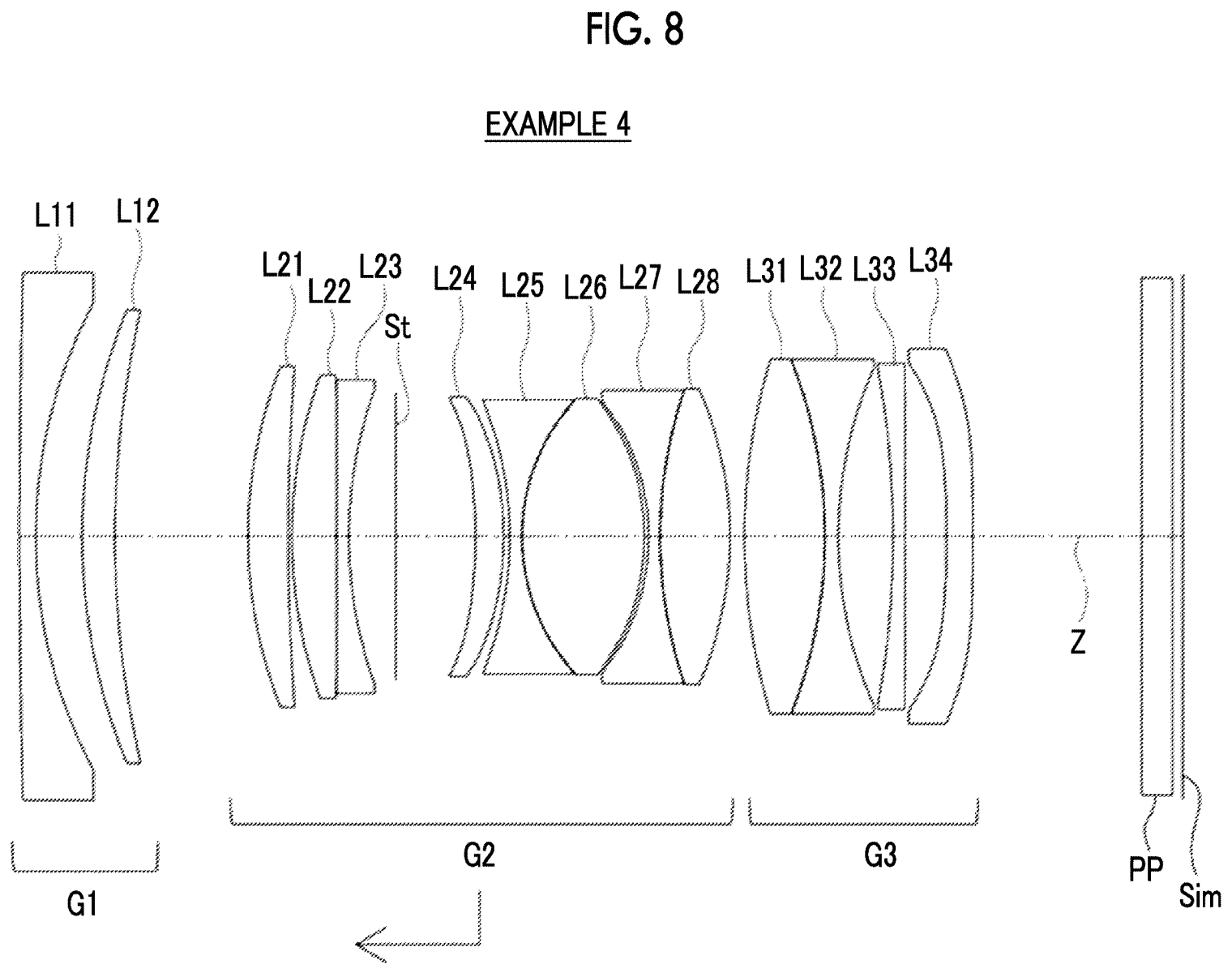

FIG. 8 is a cross-sectional view of a configuration of an imaging lens of Example 4. The imaging lens of Example 4 consists of, in order from the object side to the image side, a first lens group G1 that has a negative refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of four lenses L31 to L34, in order from the object side to the image side. During focusing from the infinite distance object to the closest object, the first lens group G1 and the third lens group G3 remain stationary with respect to the image plane Sim, and the second lens group G2 moves toward the object side.

Figure 9:
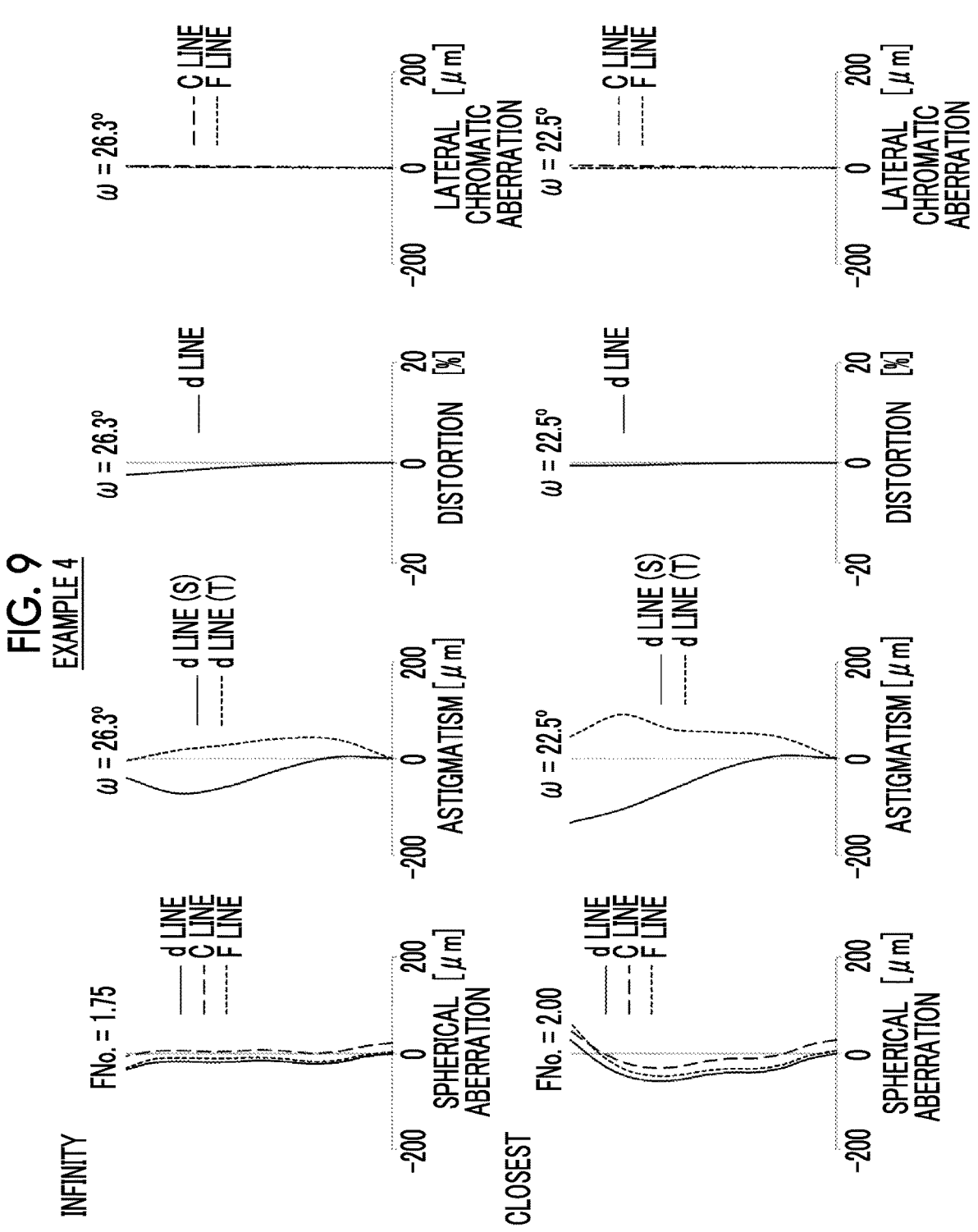
FIG. 9 is a diagram showing aberrations of the imaging lens of Example 4.

Regarding the imaging lens of Example 4, Table 10 shows basic lens data, Table 11 shows specifications and variable surface spacings, and Table 12 shows aspherical coefficients thereof. FIG. 9 shows aberration diagrams.

TABLE 10

Example 4

| Sn | R | D | Nd | vd |
|---|---|---|---|---|
| 1 | 1096.5023 | 1.7000 | 1.51742 | 52.15 |
| 2 | 52.3151 | 4.8664 | | |
| 3 | 62.1080 | 3.4305 | 1.84850 | 43.79 |
| 4 | 104.8268 | DD[4] | | |
| 5 | 48.0545 | 4.1970 | 2.00069 | 25.46 |
| 6 | 228.0475 | 0.3871 | | |
| 7 | 49.1446 | 4.6788 | 1.55032 | 75.50 |
| 8 | −3799.0336 | 1.3000 | 1.80518 | 25.46 |
| 9 | 44.9390 | 4.9441 | | |
| 10(St) | ∞ | 8.2989 | | |
| *11 | −58.3286 | 3.0277 | 1.69281 | 53.05 |
| *12 | −32.6714 | 0.6307 | | |
| 13 | −37.3652 | 1.3000 | 1.59270 | 35.45 |
| 14 | 21.0899 | 12.7255 | 1.55032 | 75.50 |
| 15 | −23.9269 | 0.4305 | | |
| 16 | −23.4118 | 1.2200 | 1.77047 | 29.74 |
| 17 | 47.6054 | 7.3698 | 1.90200 | 25.26 |
| 18 | −37.4087 | DD[18] | | |
| 19 | 64.2565 | 8.4200 | 1.87070 | 40.73 |
| 20 | −49.9901 | 1.4200 | 1.59270 | 35.45 |
| 21 | 43.4897 | 5.7321 | | |
| 22 | −96.9619 | 1.3000 | 1.48749 | 70.44 |
| 23 | −2141.2354 | 4.2941 | | |
| *24 | −163.3806 | 2.8102 | 1.68948 | 31.02 |
| *25 | ∞ | 17.7060 | | |
| 26 | ∞ | 3.2000 | 1.51680 | 64.20 |
| 27 | ∞ | 1.0895 | | |

TABLE 11

Example 4

| | Infinity | Closest 0.4 m |
|---|---|---|
| Focal length | 56.64 | 58.17 |
| Back focal length | 20.91 | |
| Open F number | 1.75 | 2.00 |
| Maximum total angle of view [°] | 52.6 | 45.0 |
| DD[4] | 14.01 | 1.77 |
| DD[18] | 1.52 | 13.77 |

TABLE 12

Example 4

| Sn | 11 | 12 | 24 | 25 |
|---|---|---|---|---|
| KA | 1.0000000E+00 | 1.0000000E+00 | 1.0000000E+00 | 1.0000000E+00 |
| A4 | −1.3641535E−05 | −6.2905831E−06 | −3.4977238E−05 | −2.9544177E−05 |
| A6 | −2.9546451E−08 | 6.8842459E−09 | 3.8381288E−08 | 9.3948338E−09 |
| A8 | −5.7345647E−12 | −7.2357910E−10 | −2.6960417E−10 | 3.1598791E−10 |
| A10 | 2.0363526E−12 | 1.1720443E−11 | 2.7617645E−12 | −3.0810672E−12 |
| A12 | −4.2390329E−14 | −1.1915746E−13 | −1.8422371E−14 | 1.8153363E−14 |
| A14 | 4.0499865E−16 | 7.5571521E−16 | 7.6680446E−17 | −6.7194254E−17 |
| A16 | −2.2513256E−18 | −3.0142873E−18 | −1.8910560E−19 | 1.5265477E−19 |
| A18 | 6.8244314E−21 | 6.9315309E−21 | 2.5195062E−22 | −1.9387623E−22 |
| A20 | −8.9257651E−24 | −7.1626802E−24 | −1.3863803E−25 | 1.0518367E−25 |

Example 5

Figure 10:
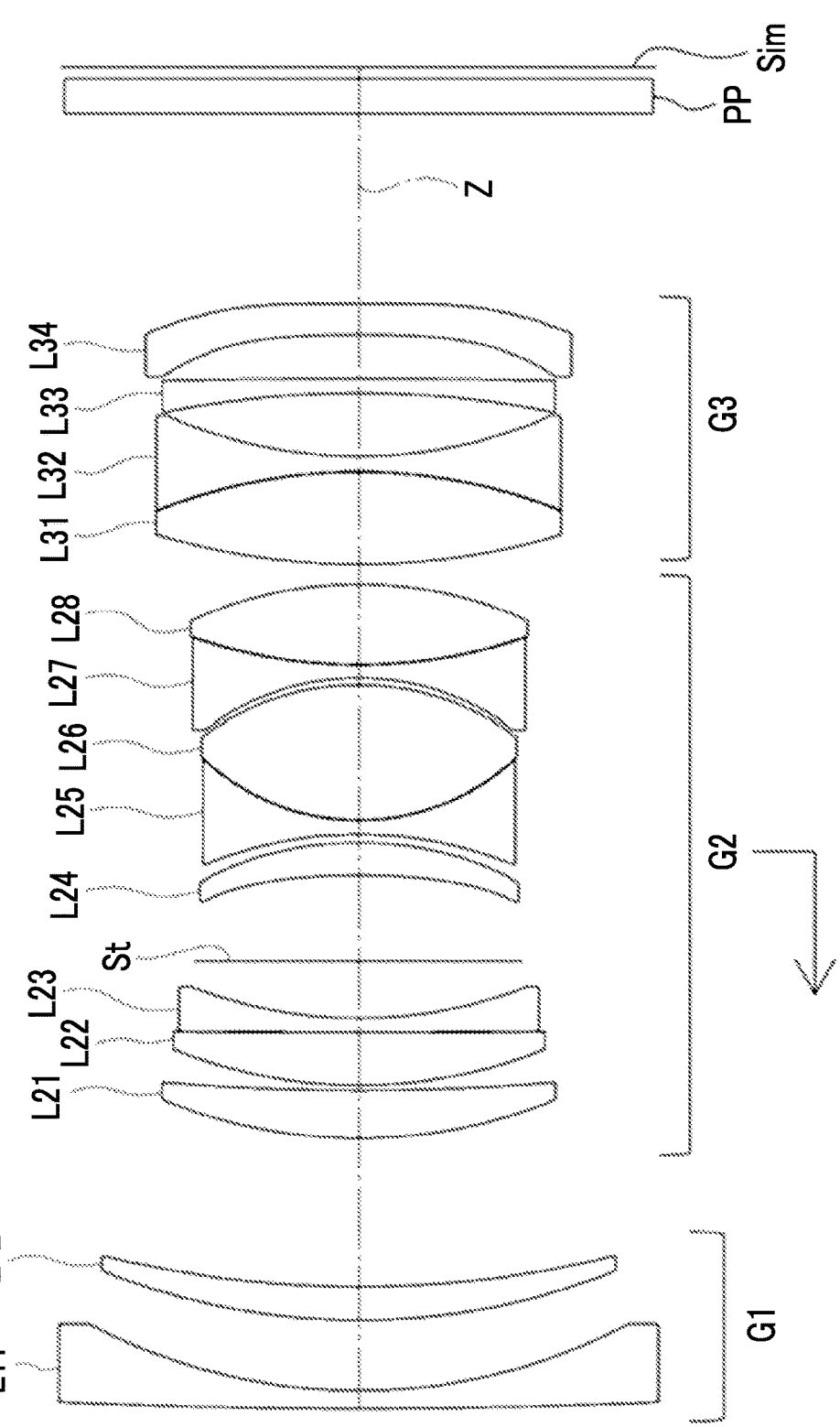
FIG. 10 is a cross-sectional view showing a configuration of an imaging lens of Example 5.

FIG. 10 is a cross-sectional view of a configuration of an imaging lens of Example 5. The imaging lens of Example 5 consists of, in order from the object side to the image side, a first lens group G1 that has a negative refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of four lenses L31 to L34, in order from the object side to the image side. During focusing from the infinite distance object to the closest object, the first lens group G1 and the third lens group G3 remain stationary with respect to the image plane Sim, and the second lens group G2 moves toward the object side.

Figure 11:
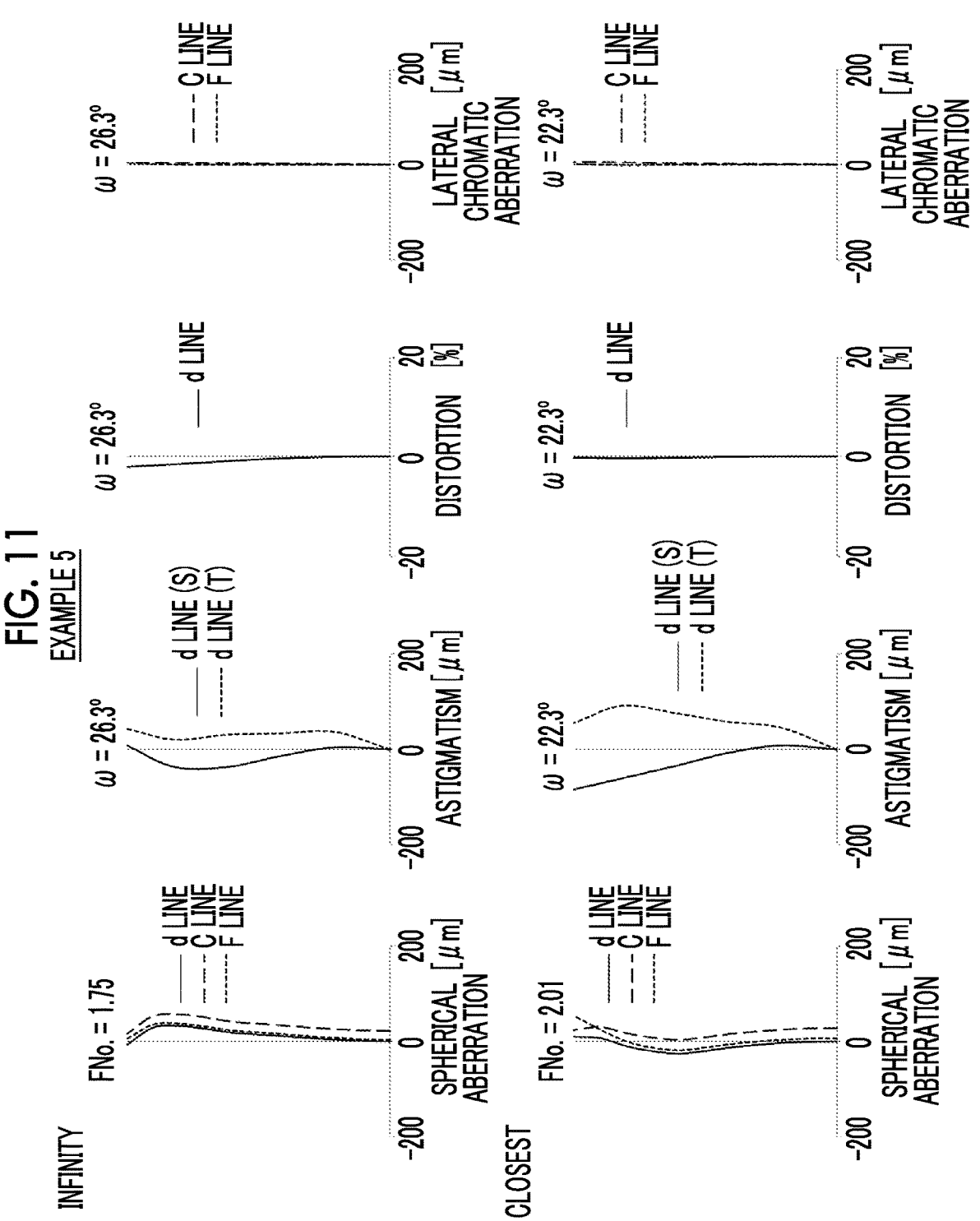
FIG. 11 is a diagram showing aberrations of the imaging lens of Example 5.

Regarding the imaging lens of Example 5, Table 13 shows basic lens data, Table 14 shows specifications and variable surface spacings, and Table 15 shows aspherical coefficients thereof. FIG. 11 shows aberration diagrams.

TABLE 13

Example 5

| Sn | R | D | Nd | vd |
|---|---|---|---|---|
| 1 | 619.6962 | 1.7000 | 1.51742 | 52.15 |
| 2 | 53.0010 | 6.4799 | | |
| 3 | 63.6990 | 3.0525 | 1.84850 | 43.79 |
| 4 | 97.7288 | DD[4] | | |
| 5 | 47.2761 | 4.3853 | 2.00069 | 25.46 |
| 6 | 207.9748 | 0.4957 | | |
| 7 | 45.5476 | 4.8536 | 1.55032 | 75.50 |
| 8 | 1358.1542 | 1.3000 | 1.80518 | 25.46 |
| 9 | 42.3094 | 5.1951 | | |
| 10(St) | ∞ | 7.9175 | | |
| *11 | −65.6244 | 3.0342 | 1.67686 | 54.80 |
| *12 | −34.3731 | 0.7793 | | |
| 13 | −37.2705 | 1.3000 | 1.59270 | 35.45 |
| 14 | 20.8727 | 12.3360 | 1.55032 | 75.50 |
| 15 | −24.2821 | 0.6247 | | |
| 16 | −23.4861 | 1.2200 | 1.77047 | 29.74 |
| 17 | 47.3162 | 7.4334 | 1.90200 | 25.26 |
| 18 | −36.8872 | DD[18] | | |
| 19 | 64.3302 | 8.4883 | 1.87070 | 40.73 |
| 20 | −49.9352 | 1.4200 | 1.59270 | 35.45 |
| 21 | 43.2942 | 5.8023 | | |
| 22 | −91.9029 | 1.3000 | 1.48749 | 70.44 |
| 23 | −1098.1976 | 4.1309 | | |
| *24 | −156.0822 | 2.8580 | 1.68948 | 31.02 |
| *25 | ∞ | 17.4417 | | |

TABLE 13-continued

| | Example 5 | | | |
|---|---|---|---|---|
| Sn | R | D | Nd | νd |
| 26 | ∞ | 3.2000 | 1.51680 | 64.20 |
| 27 | ∞ | 1.0907 | | |

TABLE 14

| | Example 5 | |
|---|---|---|
| | Infinity | Closest 0.4 m |
| Focal length | 56.57 | 58.24 |
| Back focal length | 20.64 | |
| Open F number | 1.75 | 2.01 |
| Maximum total angle of view [°] | 52.6 | 44.6 |
| DD[4] | 13.68 | 1.40 |
| DD[18] | 1.83 | 14.11 |

TABLE 15

| | Example 5 | | | |
|---|---|---|---|---|
| Sn | 11 | 12 | 24 | 25 |
| KA | 1.0000000E+00 | 1.0000000E+00 | 1.0000000E+00 | 1.0000000E+00 |
| A4 | −1.4684544E−05 | −6.8380996E−06 | −3.9688167E−05 | −3.4632069E−05 |
| A6 | 1.4193437E−08 | 1.4704274E−08 | 1.0499302E−07 | 8.6720325E−08 |
| A8 | −9.9616058E−10 | −7.9138466E−10 | −7.8917380E−10 | −3.9737200E−10 |
| A10 | 1.8421719E−11 | 1.3306035E−11 | 4.8224519E−12 | 1.4871086E−12 |
| A12 | −2.1933900E−13 | −1.4369797E−13 | −1.8169691E−14 | −1.5553129E−15 |
| A14 | 1.6266855E−15 | 9.6817276E−16 | 3.9210226E−17 | −1.0248210E−17 |
| A16 | −7.3958895E−18 | −4.0354185E−18 | −3.7131076E−20 | 4.5937190E−20 |
| A18 | 1.8774417E−20 | 9.4770742E−21 | −6.6484212E−24 | −7.5481412E−23 |
| A20 | −2.0582374E−23 | −9.7205315E−24 | 2.6860442E−26 | 4.5910618E−26 |

Example 6

Figure 12:
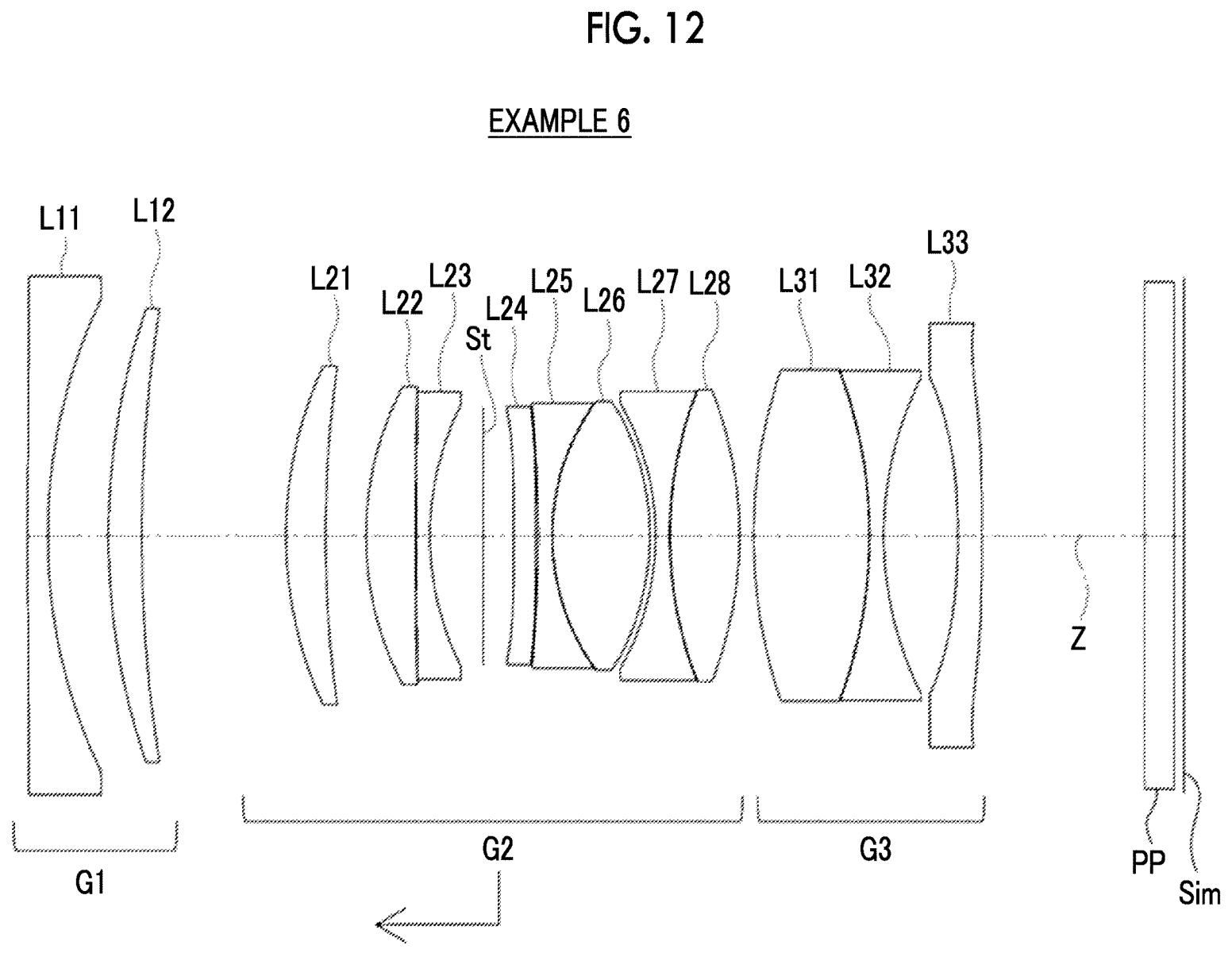

FIG. 12 is a cross-sectional view of a configuration of an imaging lens of Example 6. The imaging lens of Example 6 consists of, in order from the object side to the image side, a first lens group G1 that has a negative refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of three lenses L31 to L33, in order from the object side to the image side. During focusing from the infinite distance object to the closest object, the first lens group G1 and the third lens group G3 remain stationary with respect to the image plane Sim, and the second lens group G2 moves toward the object side.

Figure 13:
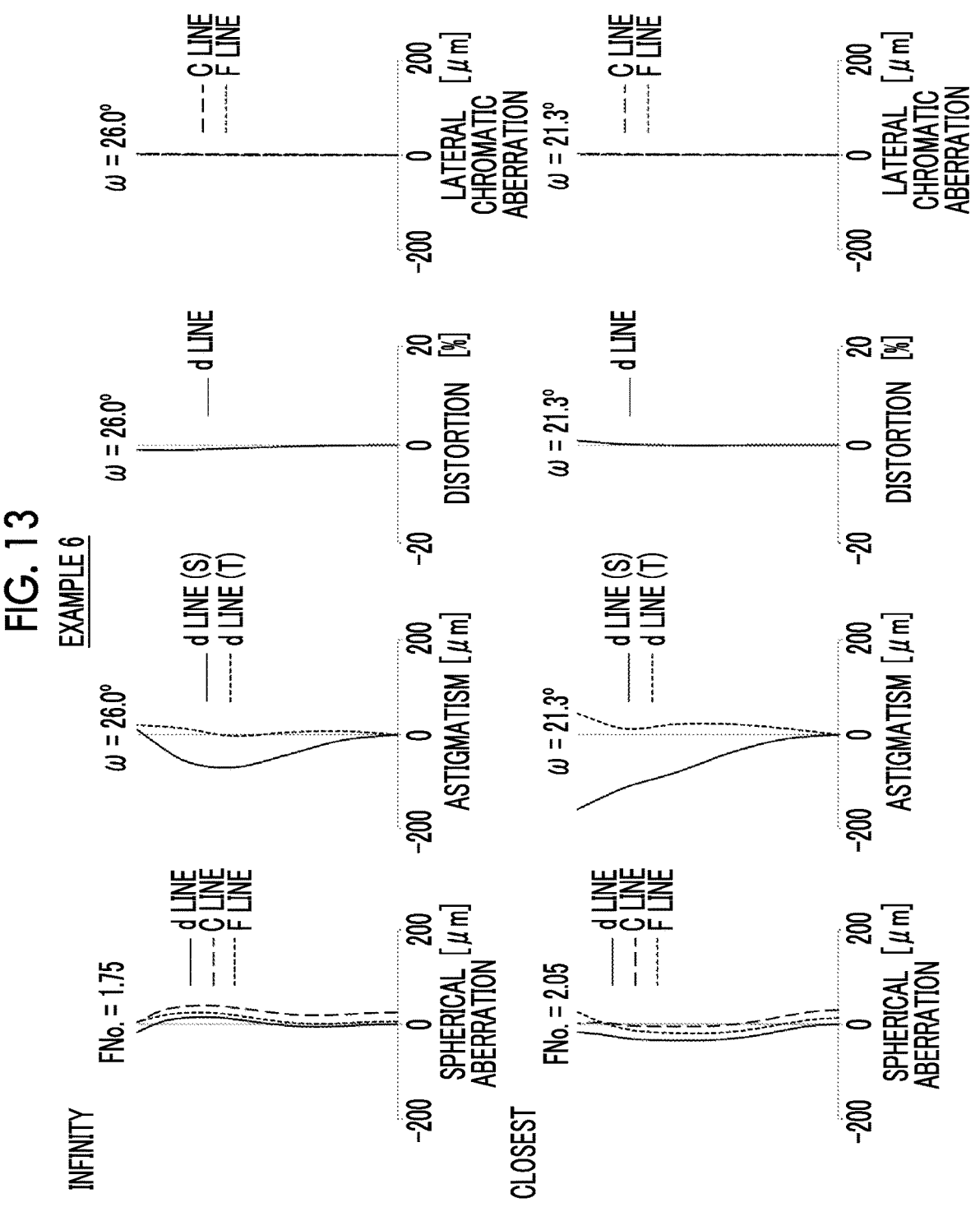
FIG. 13 is a diagram showing aberrations of the imaging lens of Example 6.

Regarding the imaging lens of Example 6, Table 16 shows basic lens data, Table 17 shows specifications and variable surface spacings, and Table 18 shows aspherical coefficients thereof. FIG. 13 shows aberration diagrams.

TABLE 16

| | Example 6 | | | |
|---|---|---|---|---|
| Sn | R | D | Nd | νd |
| 1 | 3395.1569 | 2.1000 | 1.51742 | 52.15 |
| 2 | 58.1682 | 6.4667 | | |
| 3 | 74.0322 | 3.5505 | 1.77535 | 50.30 |
| 4 | 153.3942 | DD[4] | | |
| 5 | 42.4814 | 4.2313 | 2.00069 | 25.46 |
| 6 | 130.7358 | 4.3112 | | |
| 7 | 33.8928 | 5.3234 | 1.49700 | 81.61 |
| 8 | 848.1439 | 1.5000 | 1.84666 | 23.84 |
| 9 | 30.8686 | 5.6532 | | |
| 10(St) | ∞ | 3.2952 | | |
| *11 | −1998.5918 | 2.3248 | 1.80225 | 45.45 |
| *12 | −34995.5964 | 0.3024 | | |
| 13 | −142.3892 | 1.5000 | 1.59270 | 35.45 |
| 14 | 24.1595 | 10.2742 | 1.55032 | 75.50 |
| 15 | −27.6669 | 0.6305 | | |
| 16 | −28.0490 | 1.5200 | 1.77047 | 29.74 |
| 17 | 42.2219 | 7.4809 | 1.90200 | 25.26 |
| 18 | −41.4373 | DD[18] | | |
| 19 | 54.6186 | 12.3453 | 1.84850 | 43.79 |

TABLE 16-continued

| | Example 6 | | | |
|---|---|---|---|---|
| Sn | R | D | Nd | νd |
| 20 | −49.7007 | 1.5200 | 1.59551 | 39.22 |
| 21 | 37.3059 | 7.9438 | | |
| *22 | −76.8164 | 2.5455 | 1.68948 | 31.02 |
| *23 | −1406.3294 | 17.3369 | | |
| 24 | ∞ | 3.2000 | 1.51680 | 64.20 |
| 25 | ∞ | 1.0569 | | |

TABLE 17

| | Example 6 | |
|---|---|---|
| | Infinity | Closest 0.4 m |
| Focal length | 56.67 | 58.60 |
| Back focal length | 20.50 | |
| Open F number | 1.75 | 2.05 |
| Maximum total angle of view [°] | 52.0 | 42.6 |
| DD[4] | 15.42 | 1.30 |
| DD[18] | 1.50 | 15.62 |

TABLE 18

| | | Example 6 | | |
|---|---|---|---|---|
| Sn | 11 | 12 | 22 | 23 |
| KA | 1.0000000E+00 | 1.0000000E+00 | 1.0000000E+00 | 1.0000000E+00 |
| A4 | −2.0370108E−05 | −1.4890456E−05 | −2.5350781E−05 | −2.0566239E−05 |
| A6 | −2.2837244E−08 | −1.4092898E−08 | 5.0780164E−08 | 5.3699159E−08 |
| A8 | 1.5881928E−10 | 1.4530204E−10 | −5.4993528E−11 | −5.6857976E−11 |
| A10 | −2.7238168E−13 | −2.5033093E−13 | 4.3033371E−14 | 4.1725261E−14 |

Example 7

Figure 14:
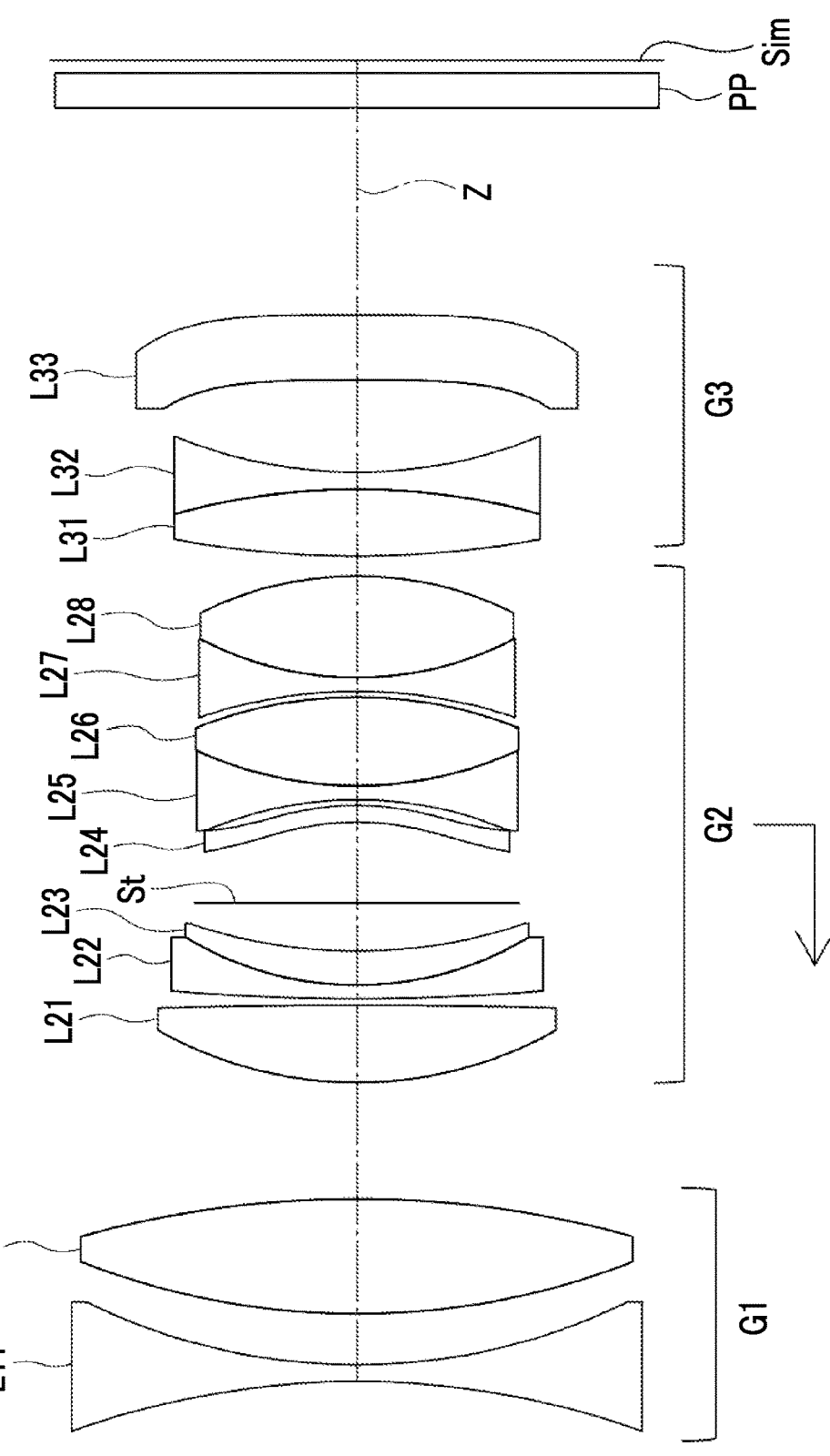
FIG. 14 is a cross-sectional view showing a configuration of an imaging lens of Example 7.
Figure 15:
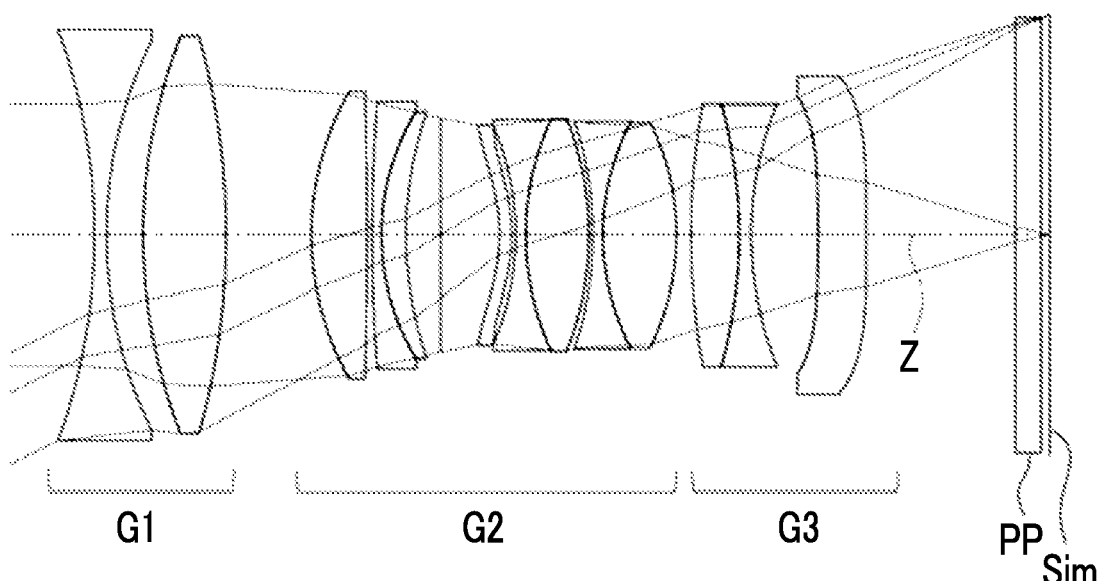
FIG. 15 is a cross-sectional view showing a configuration and a luminous flux of the imaging lens of Example 7 in each in-focus state.
Figure 15:
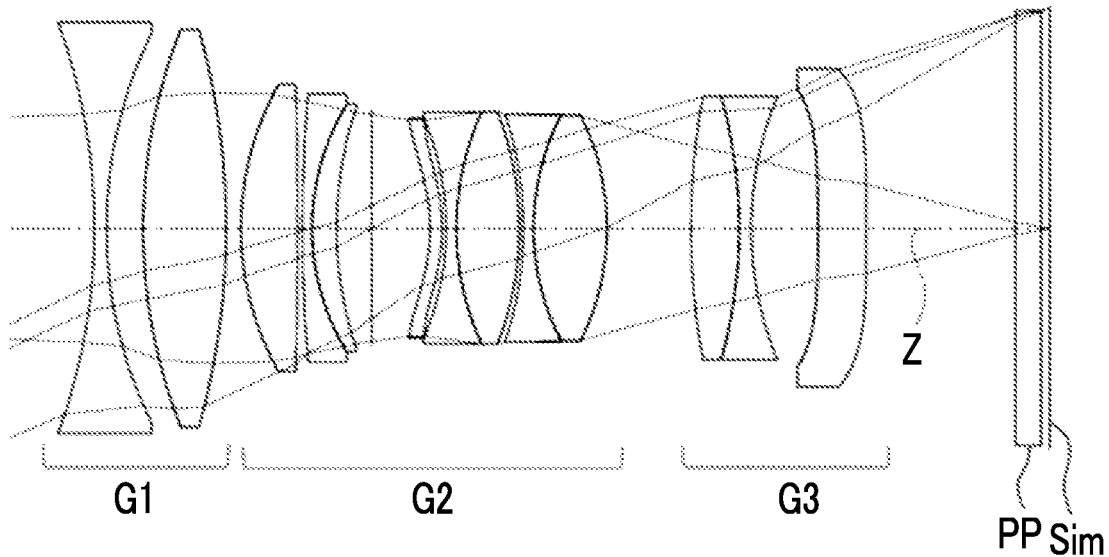

FIG. 14 is a cross-sectional view of a configuration of an imaging lens of Example 7. FIG. 15 shows a configuration and a luminous flux of the imaging lens of Example 7 in each in-focus state. The imaging lens of Example 7 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of three lenses L31 to L33, in order from the object side to the image side. During focusing from the infinite distance object to the closest object, the first lens group G1 and the third lens group G3 remain stationary with respect to the image plane Sim, and the second lens group G2 moves toward the object side.

Figure 16:
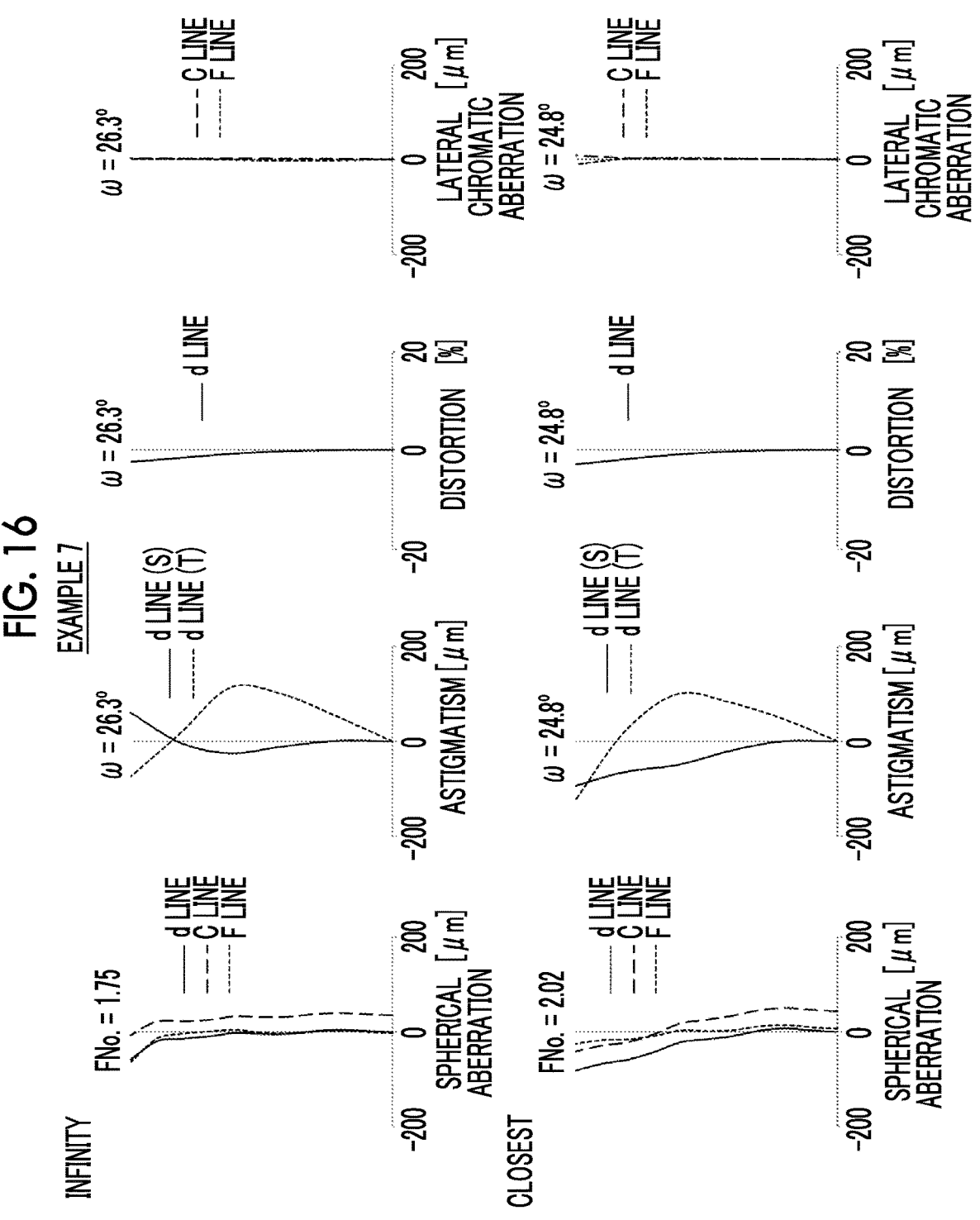
FIG. 16 is a diagram showing aberrations of the imaging lens of Example 7.

Regarding the imaging lens of Example 7, Table 19 shows basic lens data, Table 20 shows specifications and variable surface spacings, and Table 21 shows aspherical coefficients thereof. FIG. 16 shows aberration diagrams.

TABLE 19

| | | Example 7 | | |
|---|---|---|---|---|
| Sn | R | D | Nd | vd |
| 1 | −74.2002 | 1.5004 | 1.62589 | 35.71 |
| 2 | 54.7951 | 4.5676 | | |
| 3 | 67.2973 | 10.3301 | 1.84850 | 43.79 |
| 4 | −91.8786 | DD[4] | | |
| 5 | 36.0389 | 6.9203 | 1.49700 | 81.54 |

TABLE 19-continued

| | | Example 7 | | |
|---|---|---|---|---|
| Sn | R | D | Nd | vd |
| 6 | −673.5026 | 0.6005 | | |
| 7 | 195.9100 | 1.2104 | 1.78880 | 28.43 |
| 8 | 29.3996 | 3.0504 | 1.95906 | 17.47 |
| 9 | 46.3189 | 4.3619 | | |
| 10(St) | ∞ | 7.2745 | | |
| *11 | −22.9652 | 1.5064 | 1.77288 | 49.52 |
| *12 | −23.0730 | 0.4999 | | |
| 13 | −34.3566 | 1.2696 | 1.60342 | 38.01 |
| 14 | 34.2968 | 7.8557 | 1.88300 | 39.22 |
| 15 | −38.9773 | 0.5000 | | |
| 16 | −44.0475 | 1.2501 | 1.62589 | 35.71 |
| 17 | 30.0091 | 9.1601 | 1.49700 | 81.54 |
| 18 | −31.2278 | DD[18] | | |
| 19 | 89.0283 | 6.0002 | 2.05090 | 26.94 |
| 20 | −60.9661 | 1.5201 | 1.78880 | 28.43 |
| 21 | 42.6519 | 8.3048 | | |
| *22 | −362.5889 | 5.8667 | 1.68948 | 31.02 |
| *23 | −49603.4680 | 18.5774 | | |
| 24 | ∞ | 3.2000 | 1.51680 | 64.20 |
| 25 | ∞ | 1.1168 | | |

TABLE 20

| | Example 7 | |
|---|---|---|
| | Infinity | Closest 0.3 m |
| Focal length | 56.68 | 53.42 |
| Back focal length | 21.80 | |
| Open F number | 1.75 | 2.02 |
| Maximum total angle of view [°] | 52.6 | 49.6 |
| DD[4] | 10.50 | 1.85 |
| DD[18] | 1.80 | 10.45 |

TABLE 21

| | | Example 7 | | |
|---|---|---|---|---|
| Sn | 11 | 12 | 22 | 23 |
| KA | 1.0000000E+00 | 1.0000000E+00 | 1.0000000E+00 | 1.0000000E+00 |
| A4 | 2.5834482E−05 | 3.5233375E−05 | −1.9489798E−05 | −1.8756029E−05 |
| A6 | 1.4230447E−07 | 1.2017891E−07 | 4.5980287E−09 | −1.4958224E−09 |
| A8 | 1.0863765E−09 | 1.3469675E−09 | −1.3030472E−10 | −1.1231071E−11 |
| A10 | −7.1869644E−12 | −9.4293828E−12 | 4.6758898E−13 | −1.9986449E−14 |
| A12 | −1.8017228E−14 | 4.3520165E−15 | −9.1351399E−16 | 8.1504928E−17 |
| A14 | 1.9336504E−16 | 1.2332495E−16 | −1.0803165E−18 | −1.4199100E−19 |
| A16 | 2.1041180E−19 | −1.1370078E−20 | 3.7286670E−21 | −6.3534328E−22 |
| A18 | −4.7995190E−21 | −3.0882641E−21 | 2.3552136E−24 | 1.9831483E−24 |
| A20 | 1.0653244E−23 | 7.9618424E−24 | −1.6142404E−26 | −1.9645180E−27 |

Example 8

Figure 17:
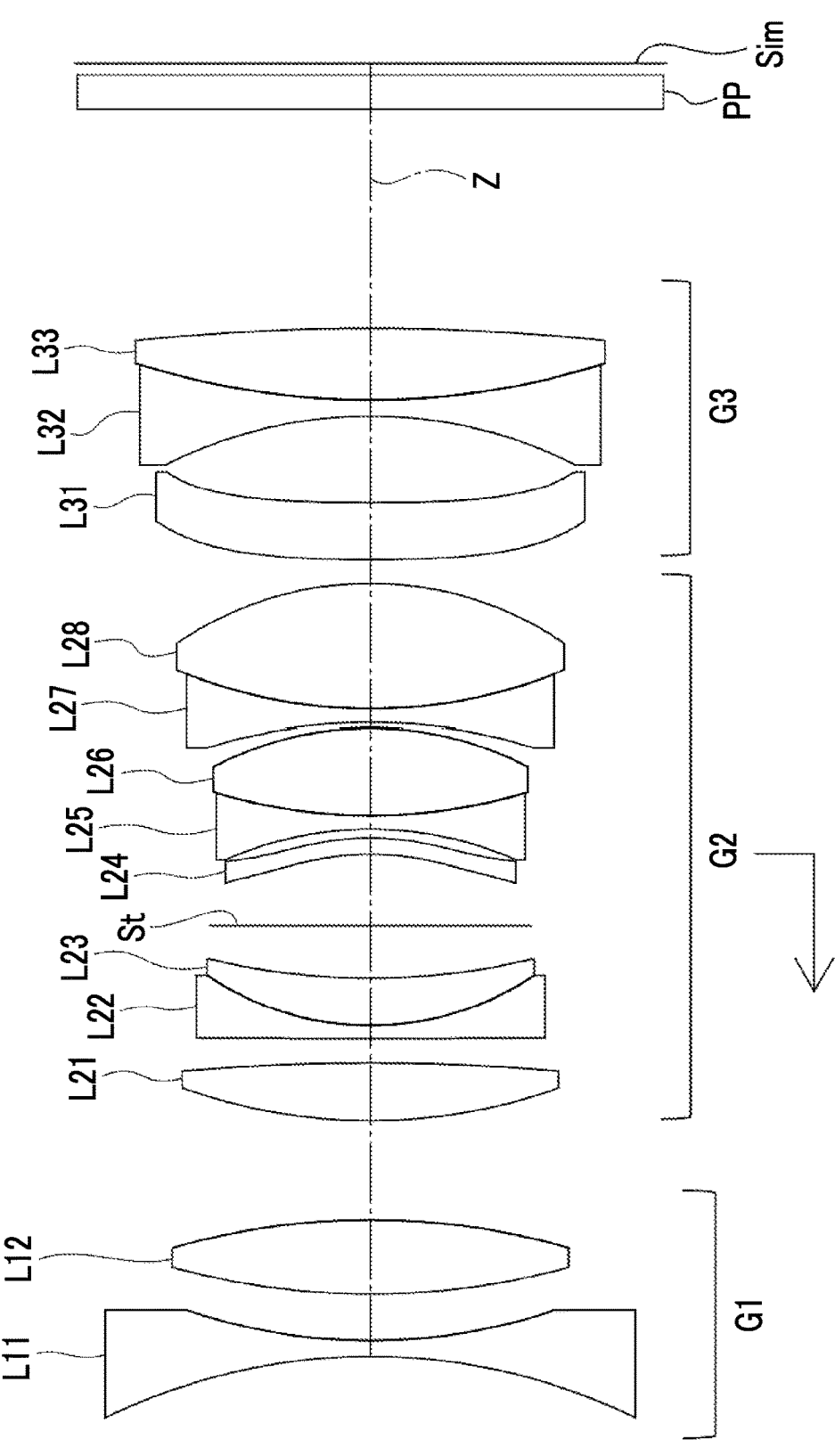
FIG. 17 is a cross-sectional view showing a configuration of an imaging lens of Example 8.

FIG. 17 is a cross-sectional view of a configuration of the imaging lens of Example 8. The imaging lens of Example 8 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of three lenses L21 to L23, an aperture stop St, and five lenses L24 to L28, in order from the object side to the image side. The third lens group G3 consists of three lenses L31 to L33, in order from the object side to the image side. During focusing from the infinite

TABLE 23

| | Example 8 | |
| --- | --- | --- |
| | Infinity | Closest 0.3 m |
| Focal length | 56.66 | 52.81 |
| Back focal length | 23.56 | |
| Open F number | 1.87 | 2.05 |
| Maximum total angle of view [°] | 52.4 | 50.0 |
| DD[4] | 9.22 | 2.26 |
| DD[18] | 2.20 | 9.16 |

TABLE 24

| | | Example 8 | | |
| --- | --- | --- | --- | --- |
| Sn | 11 | 12 | 19 | 20 |
| KA | 1.0000000E+00 | 1.0000000E+00 | 1.0000000E+00 | 1.0000000E+00 |
| A4 | 2.3141499E−05 | 3.5040371E−05 | 1.0901635E−05 | 1.0972604E−05 |
| A6 | 2.0476056E−07 | 1.8774222E−07 | 4.9742889E−09 | 2.7459160E−09 |
| A8 | 5.1639404E−10 | 6.8988986E−10 | 2.9537492E−11 | 6.9726952E−11 |
| A10 | −6.5656740E−12 | −7.1573836E−12 | −8.6060280E−14 | −1.9723645E−13 |
| A12 | −1.5625730E−14 | −7.1690268E−16 | 1.3753977E−16 | 2.1742531E−16 |
| A14 | 1.3301247E−16 | 5.8424761E−17 | 6.5295193E−20 | 6.9093173E−19 |
| A16 | 3.9338744E−19 | 5.0949835E−20 | −2.5358679E−22 | −8.4826027E−22 |
| A18 | −3.2855806E−21 | 9.8202667E−23 | −2.0567368E−25 | −3.2467257E−24 |
| A20 | 4.5982792E−24 | −2.1816972E−24 | 6.5435938E−28 | 6.1122298E−27 | distance object to the closest object, the first lens group G1 and the third lens group G3 remain stationary with respect to the image plane Sim, and the second lens group G2 moves toward the object side.

Figure 18:
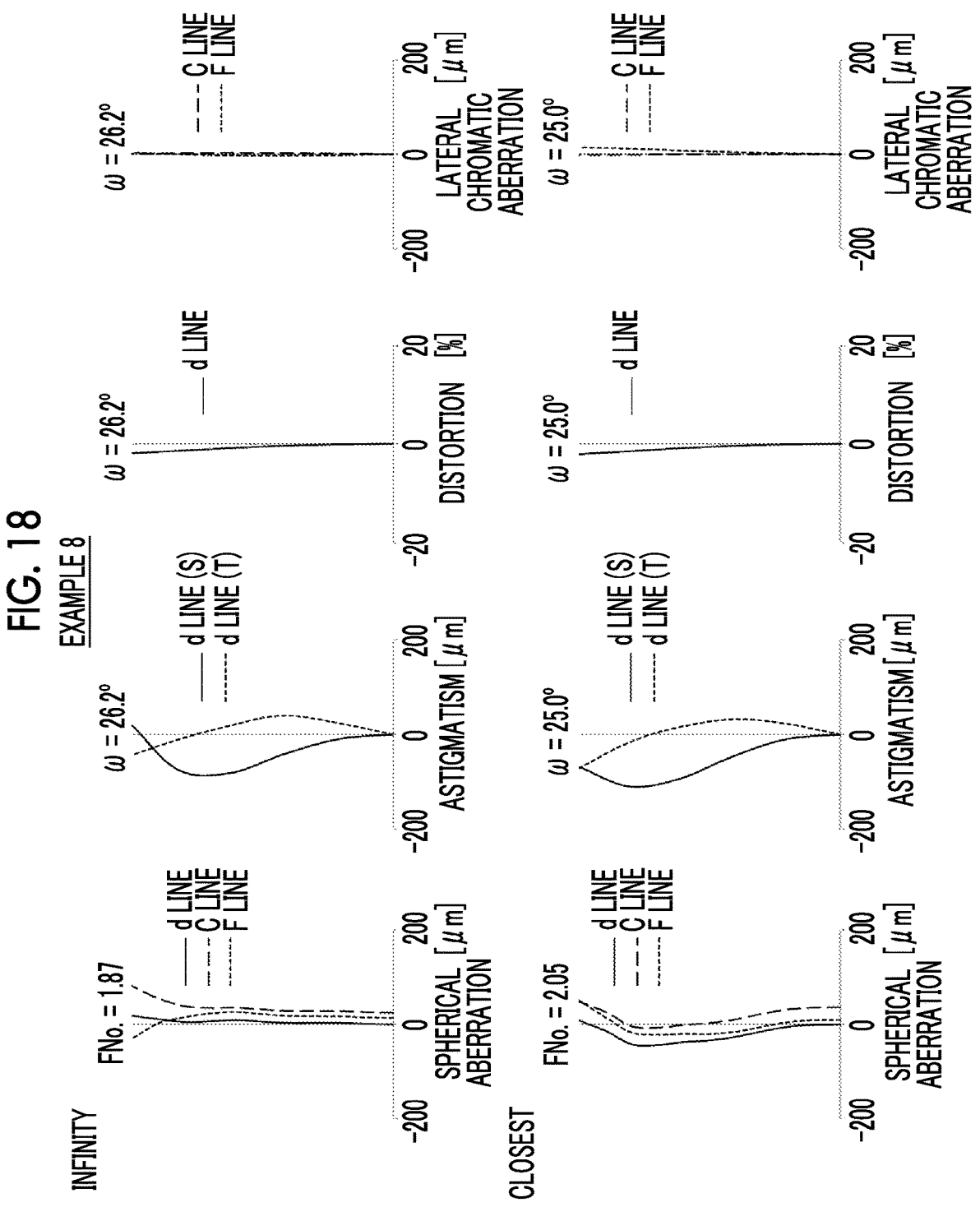
FIG. 18 is a diagram showing aberrations of the imaging lens of Example 8.

Regarding the imaging lens of Example 8, Table 22 shows basic lens data, Table 23 shows specifications and variable surface spacings, and Table 24 shows aspherical coefficients thereof. FIG. 18 shows aberration diagrams.

TABLE 22

| | | Example 8 | | |
| --- | --- | --- | --- | --- |
| Sn | R | D | Nd | vd |
| 1 | −55.4781 | 1.5005 | 1.71597 | 29.20 |
| 2 | 52.6357 | 4.3066 | | |
| 3 | 68.8911 | 6.9165 | 1.90277 | 37.58 |
| 4 | −65.6648 | DD[4] | | |
| 5 | 51.4520 | 5.3294 | 1.53775 | 74.70 |
| 6 | −208.6059 | 2.2852 | | |
| 7 | 5943.6545 | 1.2104 | 1.78880 | 28.43 |
| 8 | 26.5730 | 4.4173 | 2.00272 | 19.32 |
| 9 | 63.0765 | 4.8695 | | |
| 10(St) | ∞ | 6.6395 | | |
| *11 | −23.8573 | 1.5003 | 1.80139 | 45.45 |
| *12 | −23.9840 | 0.8152 | | |
| 13 | −33.0768 | 1.2700 | 1.62305 | 35.70 |
| 14 | 49.3561 | 8.1326 | 1.71698 | 55.65 |
| 15 | −30.7939 | 0.5002 | | |
| 16 | −49.8275 | 1.2501 | 1.61346 | 37.01 |
| 17 | 46.3660 | 11.6144 | 1.56907 | 71.30 |
| 18 | −31.5431 | DD[18] | | |
| *19 | 158.7683 | 5.3140 | 1.68948 | 31.02 |
| *20 | 238.5368 | 8.0513 | | |
| 21 | −41.9442 | 1.5105 | 1.73800 | 32.33 |
| 22 | 70.9843 | 6.6239 | 2.05090 | 26.94 |
| 23 | −209.1484 | 20.3478 | | |
| 24 | ∞ | 3.2000 | 1.51680 | 64.20 |
| 25 | ∞ | 1.0994 | | |

Example 9

Figure 19:
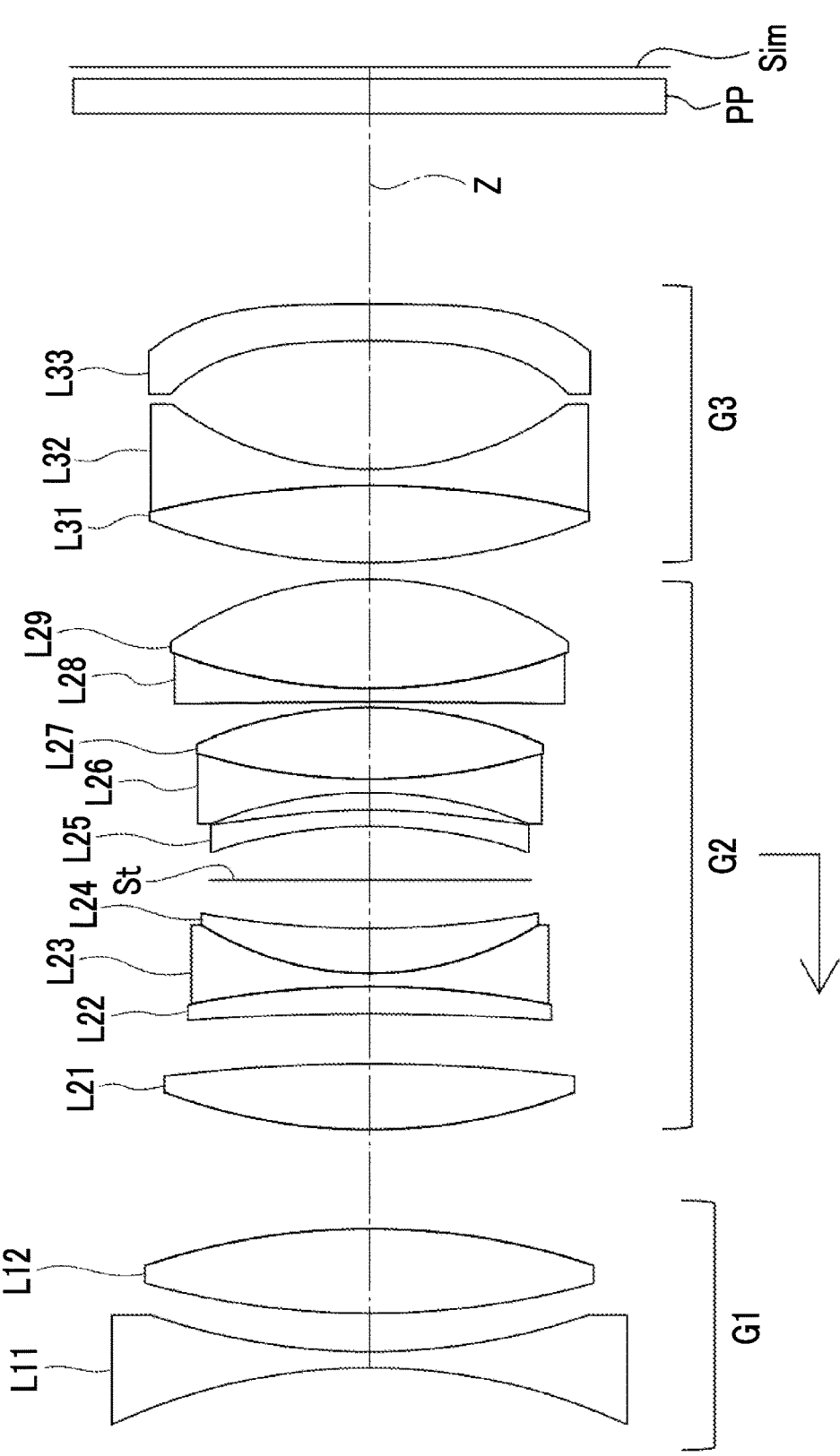
FIG. 19 is a cross-sectional view showing a configuration of an imaging lens of Example 9.

FIG. 19 is a cross-sectional view of a configuration of an imaging lens of Example 9. The imaging lens of Example 9 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of four lenses L21 to L24, an aperture stop St, and five lenses L25 to L29, in order from the object side to the image side. The third lens group G3 consists of three lenses L31 to L33, in order from the object side to the image side. During focusing from the infinite distance object to the closest object, the first lens group G1 and the third lens group G3 remain stationary with respect to the image plane Sim, and the second lens group G2 moves toward the object side.

Figure 20:
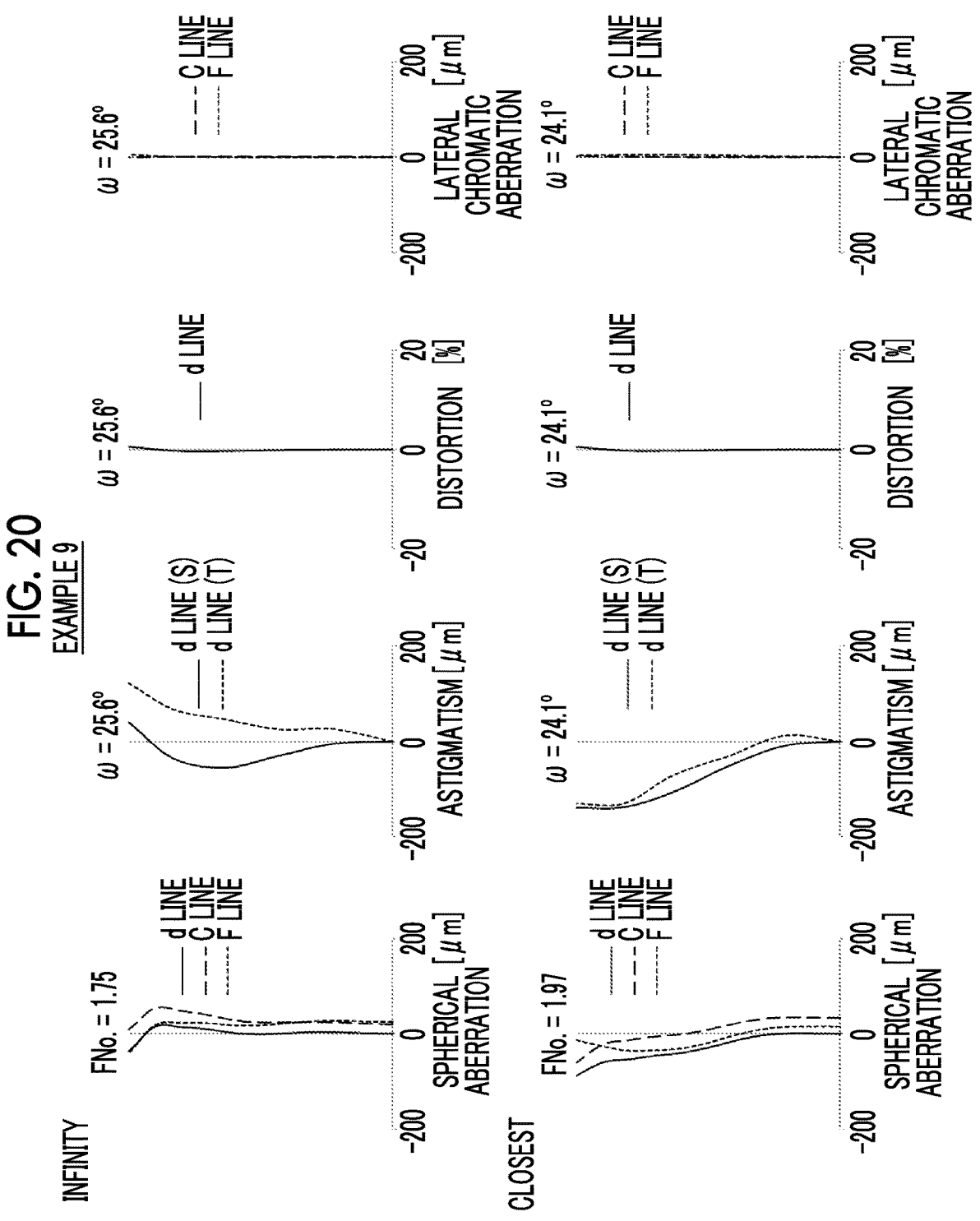
FIG. 20 is a diagram showing aberrations of the imaging lens of Example 9.

Regarding the imaging lens of Example 9, Table 25 shows basic lens data, Table 26 shows specifications and variable surface spacings, and Table 27 shows aspherical coefficients thereof. FIG. 20 shows aberration diagrams.

TABLE 25

| | | Example 9 | | |
| --- | --- | --- | --- | --- |
| Sn | R | D | Nd | vd |
| 1 | −55.5010 | 1.5004 | 1.77592 | 29.53 |
| 2 | 61.5344 | 3.5005 | | |
| 3 | 78.1408 | 7.7883 | 1.92804 | 35.20 |
| 4 | −63.7904 | DD[4] | | |
| 5 | 52.9119 | 6.0001 | 1.49700 | 81.54 |
| 6 | −160.5984 | 4.6399 | | |
| 7 | −221.2900 | 2.5309 | 1.56448 | 62.52 |

TABLE 25-continued

| | | Example 9 | | |
|---|---|---|---|---|
| Sn | R | D | Nd | νd |
| 8 | −82.3543 | 1.2105 | 1.78880 | 28.43 |
| 9 | 28.8519 | 4.0890 | 2.00272 | 19.32 |
| 10 | 85.1135 | 4.4229 | | |
| 11(St) | ∞ | 4.9244 | | |
| *12 | −45.5044 | 1.5003 | 1.77569 | 50.43 |
| *13 | −57.0757 | 1.5711 | | |
| 14 | −38.4878 | 1.2705 | 1.58980 | 39.02 |
| 15 | 53.1569 | 6.5197 | 1.69563 | 56.72 |
| 16 | −39.5618 | 0.5005 | | |
| 17 | −815.3912 | 1.2500 | 1.63200 | 34.86 |
| 18 | 51.2051 | 10.0103 | 1.49700 | 81.54 |
| 19 | −31.3936 | DD[19] | | |
| 20 | 54.3351 | 7.0963 | 1.97058 | 30.94 |
| 21 | −82.7481 | 1.5104 | 1.73800 | 32.33 |
| 22 | 30.2278 | 11.7693 | | |
| *23 | −129.4484 | 3.3179 | 1.68948 | 31.02 |
| *24 | 1770.6130 | 17.5024 | | |
| 25 | ∞ | 3.2000 | 1.51680 | 64.20 |
| 26 | ∞ | 1.1025 | | |

TABLE 26

| | Example 9 | |
|---|---|---|
| | Infinity | Closest 0.3 m |
| Focal length | 56.66 | 52.34 |
| Back focal length | 20.71 | |
| Open F number | 1.75 | 1.97 |
| Maximum total angle of view [°] | 51.2 | 48.2 |
| DD[4] | 9.08 | 1.37 |
| DD[19] | 1.50 | 9.21 |

TABLE 27

| | | Example 9 | | |
|---|---|---|---|---|
| Sn | 12 | 13 | 23 | 24 |
| KA | 1.0000000E+00 | 1.0000000E+00 | 1.0000000E+00 | 1.0000000E+00 |
| A4 | −8.1254829E−07 | 1.0256715E−05 | −3.5841263E−05 | −3.4327199E−05 |
| A6 | 1.0942583E−08 | 1.4345714E−08 | 4.0072728E−08 | 3.8082172E−08 |
| A8 | −3.6270204E−11 | 1.5201345E−11 | −1.5619767E−10 | −4.9820793E−11 |
| A10 | −9.7745712E−14 | −2.5640286E−13 | 4.0277660E−13 | −7.0011533E−14 |
| A12 | −4.2644969E−16 | −4.0303831E−16 | −6.3255350E−16 | 3.7726709E−16 |
| A14 | 3.7859614E−19 | 2.1184988E−18 | −8.7255408E−19 | −5.7212545E−19 |
| A16 | 9.2818476E−21 | 6.1927584E−21 | 2.7326649E−21 | −1.4526951E−22 |
| A18 | −4.8471550E−23 | −3.0825363E−23 | 9.5716566E−25 | 1.0353526E−24 |
| A20 | 1.0408949E−25 | 3.5686110E−26 | −6.5038608E−27 | −5.6582908E−28 |

Example 10

Figure 21:
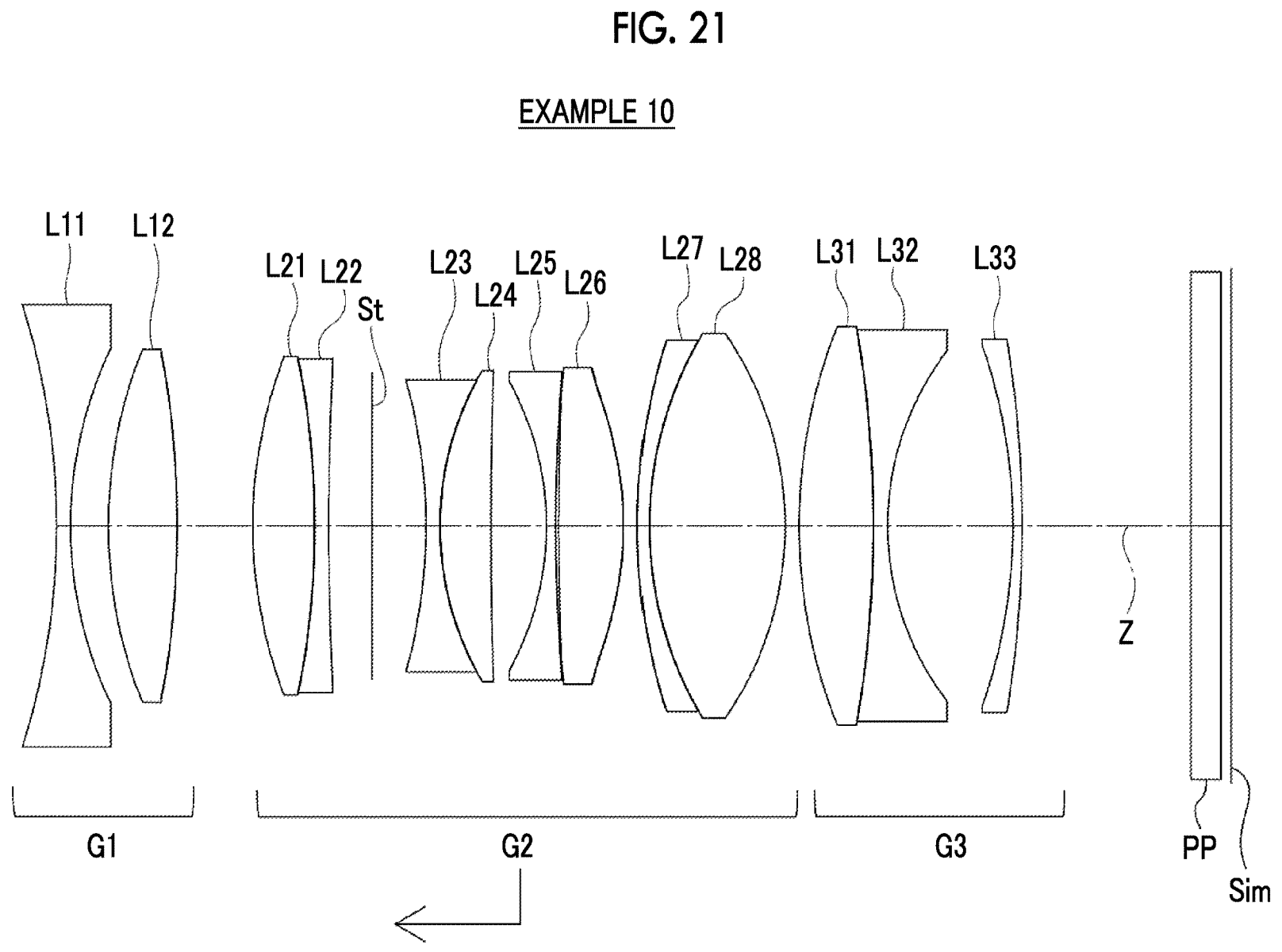

FIG. 21 is a cross-sectional view of a configuration of an imaging lens of Example 10. The imaging lens of Example 10 consists of, in order from the object side to the image side, a first lens group G1 that has a positive refractive power, a second lens group G2 that has a positive refractive power, and a third lens group G3 that has a negative refractive power. The first lens group G1 consists of two lenses L11 and L12, in order from the object side to the image side. The second lens group G2 consists of two lenses L21 and L22, an aperture stop St, and six lenses L23 to L28, in order from the object side to the image side. The third lens group G3 consists of three lenses L31 to L33, in order from the object side to the image side. During focusing from the infinite distance object to the closest object, the first lens group G1 and the third lens group G3 remain stationary with respect to the image plane Sim, and the second lens group G2 moves toward the object side.

Figure 22:
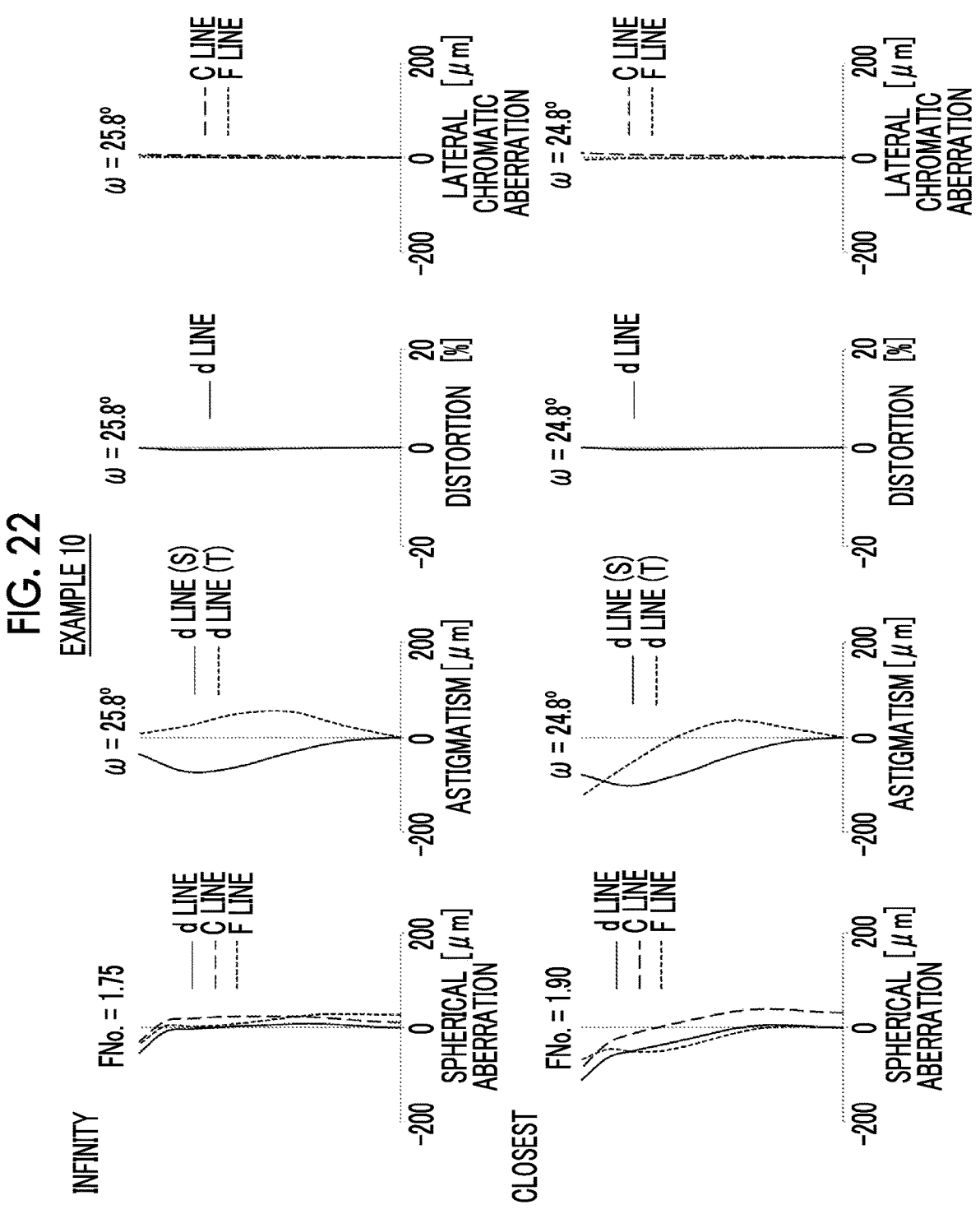
FIG. 22 is a diagram showing aberrations of the imaging lens of Example 10.

Regarding the imaging lens of Example 10, Table 28 shows basic lens data, Table 29 shows specifications and variable surface spacings, and Table 30 shows aspherical coefficients thereof. FIG. 22 shows aberration diagrams.

TABLE 28

| | | Example 10 | | |
|---|---|---|---|---|
| Sn | R | D | Nd | νd |
| 1 | −77.4967 | 1.5004 | 1.51601 | 64.38 |
| 2 | 43.7347 | 4.0249 | | |
| *3 | 51.1560 | 7.3936 | 1.58313 | 59.46 |
| *4 | −101.4720 | DD[4] | | |
| 5 | 50.3122 | 6.5974 | 1.59349 | 67.33 |
| 6 | −89.3570 | 1.5105 | 1.58000 | 40.00 |
| 7 | 370.2398 | 4.5705 | | |
| 8(St) | ∞ | 5.8219 | | |
| 9 | −57.5888 | 1.5101 | 1.81766 | 24.12 |
| 10 | 32.5428 | 5.4346 | 1.99999 | 19.97 |
| 11 | 494.0704 | 5.9097 | | |
| 12 | −31.7470 | 1.0002 | 1.58534 | 39.47 |
| 13 | 200.2081 | 0.3012 | | |
| *14 | 237.0926 | 6.9125 | 1.69350 | 53.20 |
| *15 | −36.7779 | 1.5001 | | |
| 16 | 65.2398 | 1.2503 | 1.73800 | 32.33 |
| 17 | 39.7500 | 14.4583 | 1.49700 | 81.54 |
| 18 | −35.8321 | DD[18] | | |
| 19 | 57.3259 | 7.9703 | 1.99999 | 23.16 |
| 20 | −124.2765 | 1.5201 | 1.74052 | 27.97 |
| 21 | 30.4689 | 13.3417 | | |
| 22 | −58.1711 | 1.0004 | 1.94595 | 17.98 |
| 23 | −120.6664 | 18.0497 | | |
| 24 | ∞ | 3.2000 | 1.51680 | 64.20 |
| 25 | ∞ | 1.1088 | | |

TABLE 29

| | Example 10 | |
|---|---|---|
| | Infinity | Closest 0.3 m |
| Focal length | 56.66 | 52.20 |
| Back focal length | 21.27 | |
| Open F number | 1.75 | 1.90 |
| Maximum total angle of view [°] | 51.6 | 49.6 |
| DD[4] | 8.08 | 1.47 |
| DD[18] | 1.50 | 8.10 |

TABLE 30

| | Example 10 | | | |
|---|---|---|---|---|
| Sn | 3 | 4 | 14 | 15 |
| KA | 1.0000000E+00 | 1.0000000E+00 | 1.0000000E+00 | 1.0000000E+00 |
| A4 | 6.8305746E−07 | −5.9278190E−07 | −6.6890946E−06 | 2.9449477E−06 |
| A6 | 1.0516822E−10 | −2.0245855E−10 | 6.8330568E−09 | 2.0859421E−09 |
| A8 | 2.0790626E−12 | 3.9735051E−12 | 5.6627438E−11 | 4.7946998E−11 |
| A10 | 4.1583041E−16 | −8.2659522E−15 | −2.1539694E−13 | −7.1653446E−14 |
| A12 | −3.6052648E−17 | −2.9365973E−17 | 9.2126224E−16 | 9.4448778E−17 |
| A14 | 2.6729597E−20 | 7.2956233E−20 | −2.4432692E−19 | 1.7848308E−18 |
| A16 | 6.8111301E−23 | −4.0957051E−23 | −3.5146956E−21 | −4.0489303E−21 |
| A18 | 6.0317281E−25 | 6.8351219E−25 | 6.5003920E−24 | 2.3788955E−24 |
| A20 | −1.7004826E−27 | −1.7608335E−27 | −2.7289068E−27 | 4.4713888E−27 |

Example 11

Figure 23:
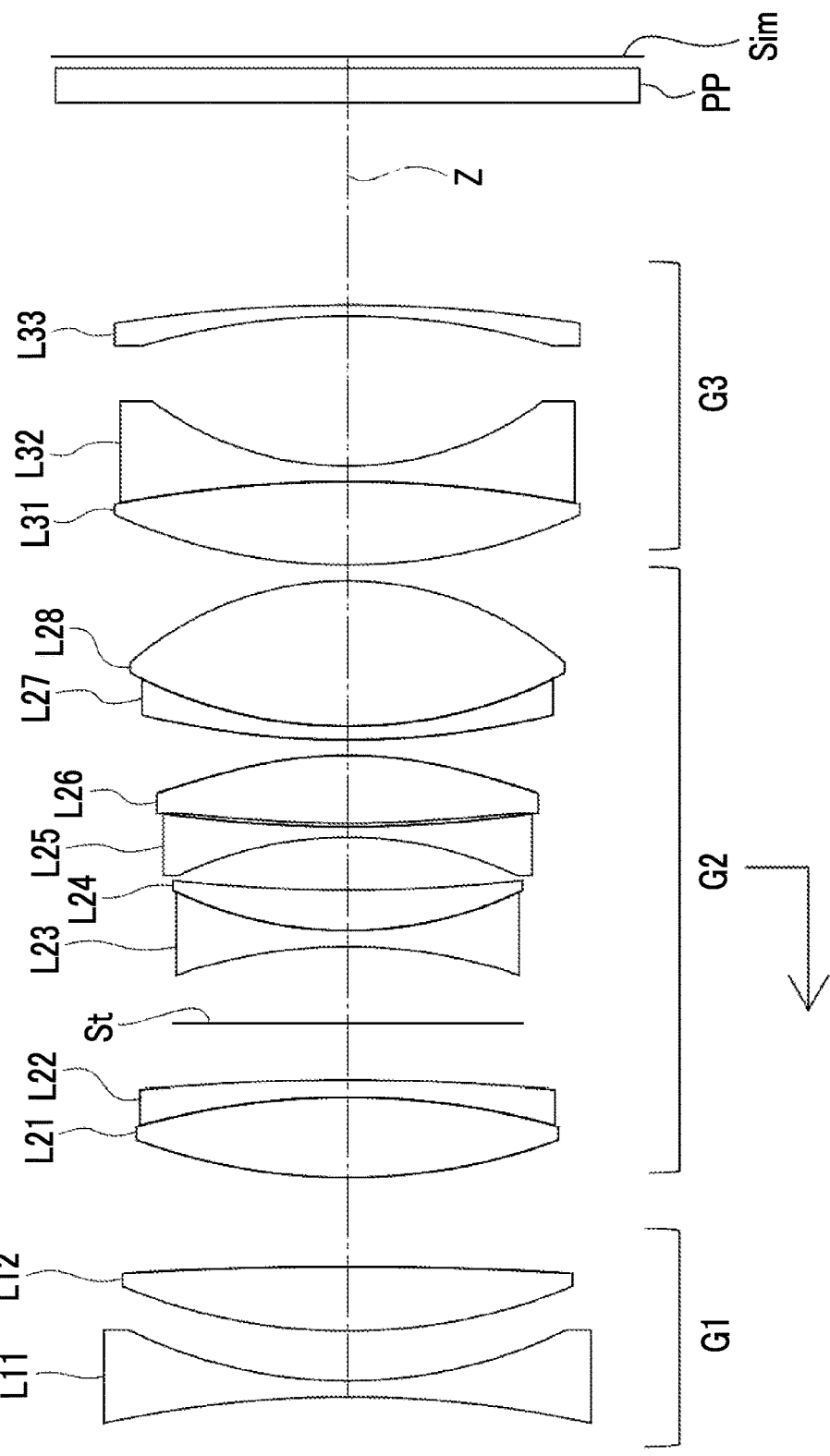
FIG. 23 is a cross-sectional view showing a configuration of an imaging lens of Example 11.

FIG. 23 is a cross-sectional view of a configuration of an imaging lens of Example 11. The imaging lens of Example 11 consists of, in order from the object side to the image side, a first lens group G1 that has a negative refractive power, a second lens group G2 that has a positive refractive power, and a third lens group G3 that has a negative refractive power. The first lens group G1 consists of two lenses L11 and L12, in order from the object side to the image side. The second lens group G2 consists of two lenses L21 and L22, an aperture stop St, and six lenses L23 to L28, in order from the object side to the image side. The third lens group G3 consists of three lenses L31 to L33, in order from the object side to the image side. During focusing from the infinite distance object to the closest object, the first lens group G1 and the third lens group G3 remain stationary with respect to the image plane Sim, and the second lens group G2 moves toward the object side.

Figure 24:
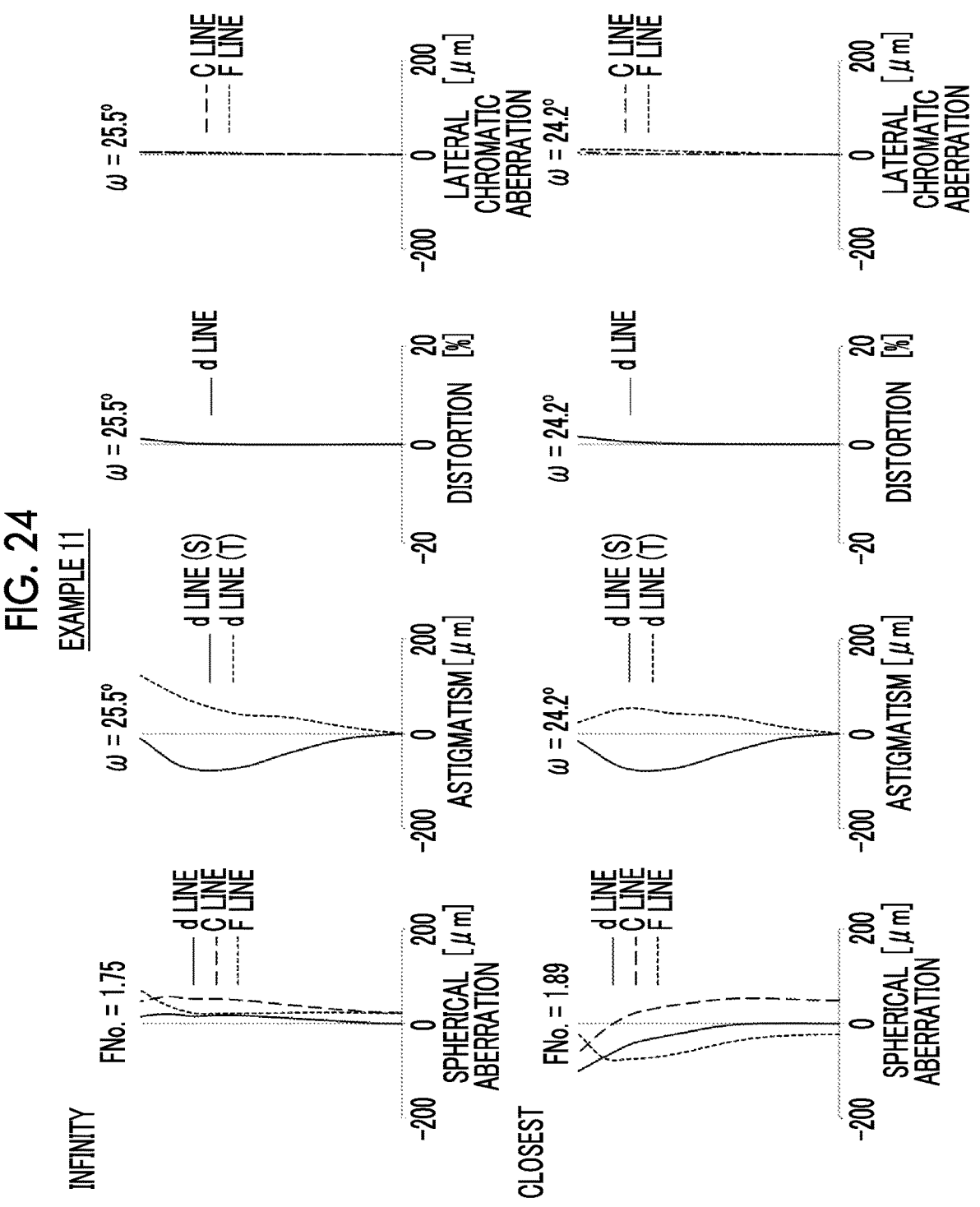
FIG. 24 is a diagram showing aberrations of the imaging lens of Example 11.

Regarding the imaging lens of Example 11, Table 31 shows basic lens data, Table 32 shows specifications and variable surface spacings, and Table 33 shows aspherical coefficients thereof. FIG. 24 shows aberration diagrams.

TABLE 31

| | Example 11 | | | |
|---|---|---|---|---|
| Sn | R | D | Nd | vd |
| 1 | −104.9851 | 1.5005 | 1.60562 | 43.88 |
| 2 | 45.6368 | 4.6429 | | |
| *3 | 56.0251 | 6.0003 | 1.80225 | 45.45 |
| *4 | −360.0544 | DD[4] | | |
| 5 | 56.3702 | 7.4604 | 1.59349 | 67.33 |
| 6 | −69.8490 | 1.5005 | 1.67270 | 32.17 |
| 7 | −214.7762 | 5.2554 | | |

TABLE 31-continued

| | Example 11 | | | |
|---|---|---|---|---|
| Sn | R | D | Nd | vd |
| 8(St) | ∞ | 7.1657 | | |
| 9 | −48.4997 | 1.5102 | 1.73800 | 32.33 |
| 10 | 36.8831 | 3.7567 | 2.00272 | 19.32 |
| 11 | 148.6751 | 4.8873 | | |
| 12 | −36.0999 | 1.0003 | 1.64769 | 33.84 |
| 13 | 121.9219 | 0.3061 | | |
| *14 | 98.6177 | 6.2984 | 1.69350 | 53.20 |
| *15 | −38.6205 | 1.5000 | | |
| 16 | 79.0409 | 1.2501 | 1.73800 | 32.33 |
| 17 | 43.0602 | 13.4920 | 1.49700 | 81.54 |
| 18 | −30.3373 | DD[18] | | |
| 19 | 52.2076 | 7.7147 | 2.00069 | 25.46 |
| 20 | −112.2028 | 1.5202 | 1.78880 | 28.43 |
| 21 | 30.0982 | 13.8385 | | |
| 22 | −65.8647 | 1.0004 | 1.94595 | 17.98 |
| 23 | −138.2921 | 18.8338 | | |
| 24 | ∞ | 3.2000 | 1.51680 | 64.20 |
| 25 | ∞ | 1.1150 | | |

TABLE 32

| | Example 11 | |
|---|---|---|
| | Infinity | Closest 0.3 m |
| Focal length | 56.71 | 52.84 |
| Back focal length | 22.06 | |
| Open F number | 1.75 | 1.89 |
| Maximum total angle of view [°] | 51.0 | 48.4 |
| DD[4] | 8.29 | 1.47 |
| DD[18] | 1.50 | 8.32 |

TABLE 33

| | Example 11 | | | |
|---|---|---|---|---|
| Sn | 3 | 4 | 14 | 15 |
| KA | 1.0000000E+00 | 1.0000000E+00 | 1.0000000E+00 | 1.0000000E+00 |
| A4 | 6.0246848E−07 | −1.6016483E−07 | −7.3693190E−06 | 4.9239754E−06 |
| A6 | 5.3758084E−10 | −2.8345217E−10 | 3.7626865E−09 | 4.2591397E−09 |
| A8 | −4.8956611E−13 | 5.6586039E−12 | 6.8793976E−11 | 3.6590867E−11 |
| A10 | 7.2466372E−15 | −1.4111265E−14 | −4.1487890E−13 | −4.7114560E−14 |
| A12 | −9.2212175E−18 | −3.0348780E−17 | 8.3611542E−16 | −1.7527013E−16 |
| A14 | −4.3213410E−20 | 1.7680421E−19 | −1.8217680E−19 | 8.1207994E−19 |
| A16 | −1.1410614E−22 | −1.6505747E−22 | −3.2085114E−21 | −4.0699041E−21 |
| A18 | 8.5519999E−25 | −2.6511387E−25 | 1.0552196E−23 | 1.7595802E−23 |
| A20 | −9.8707007E−28 | 4.1390939E−28 | −3.1898168E−26 | −3.9077483E−26 |

33

Table 34 shows corresponding values of Conditional Expressions (1) to (9) of the imaging lenses of Examples 1 to 11. In Table 34, "-" is noted in the cells where there is no corresponding lens. Preferable ranges of the conditional expressions may be set by using the corresponding values of the examples shown in Table 34 as the upper limits or the lower limits of the conditional expressions.

34

Figure 25:
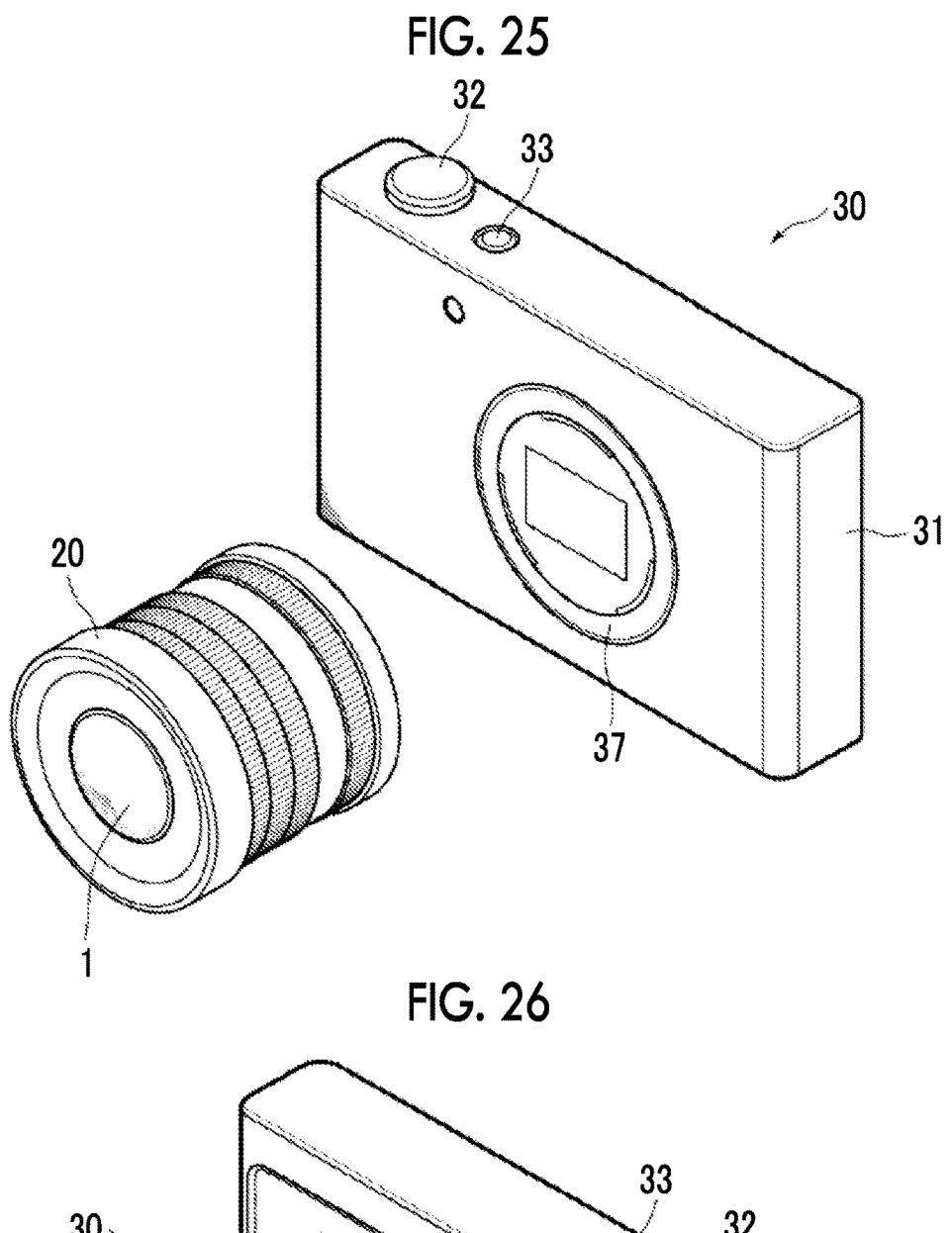
FIG. 25 is a perspective view of the front side of the imaging apparatus according to an embodiment.
Figure 26:
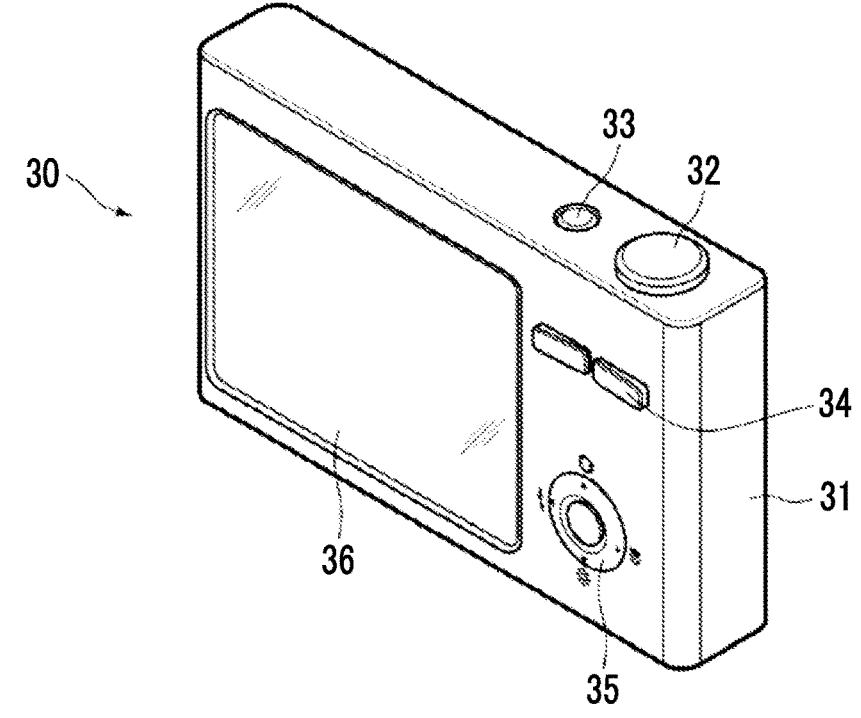
FIG. 26 is a perspective view of the rear side of the imaging apparatus according to the embodiment.

Next, an imaging apparatus according to an embodiment of the present disclosure will be described. FIGS. 25 and 26 are external views of a camera 30 which is the imaging apparatus according to the embodiment of the present disclosure. FIG. 25 is a perspective view of the camera 30 viewed from a front side, and FIG. 26 is a perspective view of the camera 30 viewed from a rear side. The camera 30 is

TABLE 34

| Expression Number | | Example 1 | Example 2 | Example 3 | Example 4 |
|---|---|---|---|---|---|
| (1) | $TTL^2/(f^2 \times \tan\omega m)$ | 9.25 | 9.21 | 9.44 | 9.22 |
| (2) | Bf/f | 0.36 | 0.36 | 0.37 | 0.37 |
| (3) | f3/f2 | −12.24 | −11.27 | −12.83 | −9.44 |
| (4) | (N2po + N2pi)/2 | 2.02580 | 2.02580 | 1.98605 | 1.95135 |
| (5) | (ν2po + ν2pi)/2 | 26.19 | 26.20 | 25.45 | 25.36 |
| (6) | f3/f1 | 2.58 | 3.02 | 2.65 | 2.01 |
| (7) | f/f1 | −0.21 | −0.26 | −0.19 | −0.20 |
| (8) | ν3p − ν3n | 4.57 | 3.77 | 5.28 | 5.28 |
| (9) | DG3/Bf | 1.12 | 1.15 | 1.09 | 1.15 |

| Expression Number | | Example 5 | Example 6 | Example 7 | Example 8 |
|---|---|---|---|---|---|
| (1) | $TTL^2/(f^2 \times \tan\omega m)$ | 9.45 | 9.54 | 8.72 | 8.97 |
| (2) | Bf/f | 0.36 | 0.36 | 0.38 | 0.42 |
| (3) | f3/f2 | −8.13 | −16.40 | −4.28 | −2.74 |
| (4) | (N2po + N2pi)/2 | 1.95135 | 1.95135 | 1.49700 | 1.55341 |
| (5) | (ν2po + ν2pi)/2 | 25.36 | 25.36 | 81.54 | 73.00 |
| (6) | f3/f1 | 1.93 | 3.20 | −1.26 | −0.68 |
| (7) | f/f1 | −0.22 | −0.17 | 0.25 | 0.24 |
| (8) | ν3p − ν3n | 5.28 | 4.57 | −1.49 | — |
| (9) | DG3/Bf | 1.16 | 1.19 | 0.99 | 0.91 |

| Expression Number | | Example 9 | Example 10 | Example 11 |
|---|---|---|---|---|
| (1) | $TTL^2/(f^2 \times \tan\omega m)$ | 9.09 | 9.97 | 9.93 |
| (2) | Bf/f | 0.37 | 0.38 | 0.39 |
| (3) | f3/f2 | −2.21 | −1.76 | −1.89 |
| (4) | (N2po + N2pi)/2 | 1.49700 | 1.54525 | 1.54525 |
| (5) | (ν2po + ν2pi)/2 | 81.54 | 74.44 | 74.44 |
| (6) | f3/f1 | −0.45 | −0.02 | 0.10 |
| (7) | f/f1 | 0.19 | 0.01 | −0.06 |
| (8) | ν3p − ν3n | −1.39 | −4.81 | −2.97 |
| (9) | DG3/Bf | 1.14 | 1.12 | 1.09 |

Although the imaging lenses of Examples 1 to 11 each are configured to be compact and lightweight, favorable optical performance is maintained by suppressing various aberrations. Further, the open F number in a state in which the infinite distance object is in focus is smaller than 2 in the imaging lenses of Examples 1 to 11, and particularly smaller than 1.8 in the imaging lenses of Examples 1 to 7 and 9 to 11. The imaging lenses of Examples 1 to 11 achieve a large aperture ratio.

In an imaging apparatus such as a digital camera, there is a demand for an interchangeable lens that has high performance, has small change in performance caused by focusing, and is able to perform imaging up to a close distance. However, in the related art, it has been difficult to achieve reduction in size and weight of a high-performance lens system by suppressing fluctuation in performance caused by focusing. Alternatively, in order to achieve reduction in size and weight, the amount of movement of the focus group cannot be ensured, and the shortest imaging distance increases. On the other hand, Examples 1 to 11 of the present disclosure achieve a compact and lightweight lens system having high performance, having small change in performance caused by focusing, and being able to perform imaging up to a close distance.

a so-called mirrorless type digital camera, and the interchangeable lens 20 can be removably mounted thereon. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

Regarding the above-mentioned embodiments and examples, the following additional notes will be further disclosed.

Additional Note 1

An imaging lens consisting of, in order from an object side to an image side: a first lens group that has a refractive power; a second lens group that has a positive refractive power; and a third lens group that has a negative refractive power, in which during focusing, the first lens group and the third lens group remain stationary with respect to an image plane, and the second lens group moves along an optical axis, the second lens group includes a stop and at least three negative lenses, and assuming that a sum of a distance on the optical axis from a lens surface closest to the object side in the first lens group to a lens surface closest to the image side in the third lens group and a back focal length of a whole system in terms of an air-equivalent distance is TTL, a focal length of the whole system in a state in which an infinite distance object is in focus is f, and a maximum half angle of view in a state in which the infinite distance object is in focus is $\omega m$, Conditional Expression (1) is satisfied, which is represented by $$5 < TTL^2/(f^2 \times \tan \omega m) < 15 \tag{1}$$

Additional Note 2

The imaging lens according to Additional Note 1, in which assuming that the back focal length of the whole system in terms of the air-equivalent distance is Bf, Conditional Expression (2) is satisfied, which is represented by $$0.1 < Bf/f < 0.6 \tag{2}$$

Additional Note 3

The imaging lens according to Additional Note 1 or 2, in which the first lens group is a lens group having a negative refractive power.

Additional Note 4

The imaging lens according to any one of Additional Notes 1 to 3, in which assuming that a focal length of the second lens group is f2, and a focal length of the third lens group is f3, Conditional Expression (3) is satisfied, which is represented by $$-18.5 < f3/f2 < -1 \tag{3}$$

Additional Note 5

The imaging lens according to any one of Additional Notes 1 to 4, in which assuming that a refractive index of a positive lens closest to the object side among the positive lenses in the second lens group at a d line is N2po, and a refractive index of a positive lens closest to the image side among the positive lenses in the second lens group at the d line is N2pi, Conditional Expression (4) is satisfied, which is represented by $$1.86 < (N2po+N2pi)/2 < 2.2 \tag{4}$$

Additional Note 6

The imaging lens according to any one of Additional Notes 1 to 5, in which assuming that an Abbe number of a positive lens closest to the object side among the positive lenses in the second lens group at a d line is v2po, and an Abbe number of a positive lens closest to the image side among the positive lenses in the second lens group at the d line is v2pi, Conditional Expression (5) is satisfied, which is represented by $$15 < (v2po+v2pi)/2 < 40 \tag{5}$$

Additional Note 7

The imaging lens according to any one of Additional Notes 1 to 6, in which assuming that a focal length of the first lens group is f1, and a focal length of the third lens group is f3, Conditional Expression (6) is satisfied, which is represented by $$1.5 < f3/f1 < 3.5 \tag{6}$$

Additional Note 8

The imaging lens according to any one of Additional Notes 1 to 7, in which assuming that a focal length of the first lens group is f1, Conditional Expression (7) is satisfied, which is represented by $$-0.35 < f/f1 < -0.08 \tag{7}$$

Additional Note 9

The imaging lens according to any one of Additional Notes 1 to 8, in which a positive lens closest to the image side among the positive lenses in the second lens group is cemented to a negative lens.

Additional Note 10

The imaging lens according to any one of Additional Notes 1 to 9, in which a positive lens closest to the object side among the positive lenses in the second lens group is a meniscus lens of which an image side surface is concave.

Additional Note 11

The imaging lens according to any one of Additional Notes 1 to 10, in which the second lens group includes at least one aspherical lens surface.

Additional Note 12

The imaging lens according to any one of Additional Notes 1 to 11, in which the third lens group includes at least one aspherical lens surface.

Additional Note 13

The imaging lens according to any one of Additional Notes 1 to 12, in which the third lens group includes a cemented lens which is formed by cementing a positive lens and a negative lens in order from the object side, and a negative lens which is disposed closest to the image side and of which an object side surface is concave.

Additional Note 14

The imaging lens according to Additional Note 13, in which assuming that an Abbe number of the positive lens of the cemented lens at a d line is v3p, and an Abbe number of the negative lens of the cemented lens at the d line is v3n, Conditional Expression (8) is satisfied, which is represented by $$1 < v3p - v3n < 10 \tag{8}$$

Additional Note 15

The imaging lens according to any one of Additional Notes 1 to 14, in which assuming that a distance on the optical axis from a lens surface closest to the object side in the third lens group to the lens surface closest to the image side in the third lens group is DG3, and the back focal length of the whole system in terms of the air-equivalent distance is Bf, Conditional Expression (9) is satisfied, which is represented by $$0.85 < DG3/Bf < 2 \tag{9}$$

Additional Note 16

The imaging lens according to any one of Additional Notes 1 to 15, in which a lens closest to the object side in the first lens group is a negative lens of which an object side surface is concave.

Additional Note 17

The imaging lens according to Additional Note 16, in which a positive lens is disposed adjacent to the image side of the negative lens closest to the object side in the first lens group.

Additional Note 18

The imaging lens according to Additional Note 17, in which the negative lens closest to the object side in the first lens group is a biconcave lens.

Additional Note 19

An imaging apparatus comprising the imaging lens according to any one of Additional Notes 1 to 18.

What is claimed is:

1. An imaging lens consisting of, in order from an object side to an image side: a first lens group that has a refractive power; a second lens group that has a positive refractive power; and a third lens group that has a negative refractive power, wherein during focusing, the first lens group and the third lens group remain stationary with respect to an image plane, and the second lens group moves along an optical axis, the second lens group includes a stop and at least three negative lenses, a sum of a distance on the optical axis from a lens surface closest to the object side in the first lens group to a lens surface closest to the image side in the third lens group and a back focal length of the imaging lens in terms of an air-equivalent distance is TTL, a focal length of the imaging lens in a state in which an infinite distance object is in focus is f, a maximum half angle of view in a state in which the infinite distance object is in focus is ωm, and Conditional Expression (1) is satisfied, which is represented by $$5 < TTL^2/(f^2 \times \tan \omega m) < 15 \tag{1}$$

wherein a focal length of the first lens group is f1, a focal length of the third lens group is f3, and Conditional Expression (6) is satisfied, which is represented by $$1.5 < f3/f1 < 3.5 \tag{6}$$

2. The imaging lens according to claim 1, wherein the back focal length of the imaging lens in terms of the air-equivalent distance is Bf, Conditional Expression (2) is satisfied, which is represented by $$0.1 < Bf/f < 0.6 \tag{2}$$

3. The imaging lens according to claim 1, wherein the first lens group is a lens group having a negative refractive power.

4. The imaging lens according to claim 1, wherein a focal length of the second lens group is f2, and Conditional Expression (3) is satisfied, which is represented by $$-18.5 < f3/f2 < -1 \tag{3}$$

5. The imaging lens according to claim 1, wherein a refractive index of a positive lens closest to the object side among positive lenses in the second lens group at a d line is N2po, a refractive index of a positive lens closest to the image side among the positive lenses in the second lens group at the d line is N2pi, and Conditional Expression (4) is satisfied, which is represented by $$1.86 < (N2po + N2pi)/2 < 2.2 \tag{4}$$

6. The imaging lens according to claim 1, wherein an Abbe number of a positive lens closest to the object side among positive lenses in the second lens group at a d line is v2po, an Abbe number of a positive lens closest to the image side among the positive lenses in the second lens group at the d line is v2pi, and Conditional Expression (5) is satisfied, which is represented by $$15 < (v2po + v2pi)/2 < 40 \tag{5}$$

7. The imaging lens according to claim 1, wherein Conditional Expression (7) is satisfied, which is represented by $$-0.35 < f/f1 < -0.08 \tag{7}$$

8. The imaging lens according to claim 1, wherein a positive lens closest to the image side among positive lenses in the second lens group is cemented to a negative lens.

9. The imaging lens according to claim 1, wherein a positive lens closest to the object side among positive lenses in the second lens group is a meniscus lens of which an image side surface is concave.

10. The imaging lens according to claim 1, wherein the second lens group includes at least one aspherical lens surface.

11. The imaging lens according to claim 1, wherein the third lens group includes at least one aspherical lens surface.

12. The imaging lens according to claim 1, wherein the third lens group includes a cemented lens which is formed by cementing a positive lens and a negative lens in order from the object side, and a negative lens which is disposed closest to the image side and of which an object side surface is concave.

13. The imaging lens according to claim 12, wherein an Abbe number of the positive lens of the cemented lens at a d line is ν3p, an Abbe number of the negative lens of the cemented lens at the d line is ν3n, and Conditional Expression (8) is satisfied, which is represented by $$1 < \nu3p - \nu3n < 10 \tag{8}$$

14. The imaging lens according to claim 1, wherein a distance on the optical axis from a lens surface closest to the object side in the third lens group to the lens surface closest to the image side in the third lens group is DG3, and the back focal length of the imaging lens in terms of the air-equivalent distance is Bf, Conditional Expression (9) is satisfied, which is represented by $$0.85 < DG3/Bf < 2 \tag{9}$$

15. The imaging lens according to claim 1, wherein a lens closest to the object side in the first lens group is a negative lens of which an object side surface is concave.

16. The imaging lens according to claim 15, wherein a positive lens is disposed adjacent to the image side of the negative lens closest to the object side in the first lens group.

17. The imaging lens according to claim 16, wherein the negative lens closest to the object side in the first lens group is a biconcave lens.

18. An imaging apparatus comprising the imaging lens according to claim 1.

\* \* \* \* \*